United States Patent
Ozawa

(10) Patent No.: US 12,130,302 B2
(45) Date of Patent: Oct. 29, 2024

(54) INERTIAL SENSOR MODULE

(71) Applicant: SEIKO EPSON CORPORATION, Tokyo (JP)

(72) Inventor: Ryohei Ozawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/942,470

(22) Filed: Sep. 12, 2022

(65) Prior Publication Data

US 2023/0079036 A1 Mar. 16, 2023

(30) Foreign Application Priority Data

Sep. 14, 2021 (JP) .................................. 2021-149261

(51) Int. Cl.
| | | |
|---|---|---|
| G01P 15/08 | (2006.01) | |
| G01C 19/5776 | (2012.01) | |
| G01P 1/00 | (2006.01) | |
| G01P 1/02 | (2006.01) | |
| G01P 15/14 | (2013.01) | |
| G01P 15/18 | (2013.01) | |

(52) U.S. Cl.
CPC .......... *G01P 15/08* (2013.01); *G01C 19/5776* (2013.01); *G01P 1/006* (2013.01); *G01P 1/023* (2013.01); *G01P 15/0802* (2013.01); *G01P 15/14* (2013.01); *G01P 15/18* (2013.01); *G01P 2015/0865* (2013.01)

(58) Field of Classification Search
CPC ...... G01P 15/18; G01P 15/0802; G01P 15/14; G01P 1/023; G01P 1/02; G01P 1/026; G01P 2015/0865; G01C 19/5776
See application file for complete search history.

(56) References Cited

U.S. PATENT DOCUMENTS

| | | | | |
|---|---|---|---|---|
| 2002/0183958 A1* | 12/2002 | McCall | ................ | G01C 21/183 |
| | | | | 702/141 |
| 2005/0000286 A1* | 1/2005 | Campbell | ............... | G01P 15/18 |
| | | | | 701/3 |
| 2006/0185432 A1* | 8/2006 | Weinberg | .................. | G01P 3/44 |
| | | | | 73/510 |
| 2015/0268265 A1* | 9/2015 | Yonezawa | ............... | G01P 15/18 |
| | | | | 73/514.01 |
| 2017/0082654 A1* | 3/2017 | Chau | ....................... | G01P 15/00 |
| 2019/0285663 A1* | 9/2019 | Chino | .................... | G01P 15/125 |
| 2020/0033825 A1* | 1/2020 | Otani | .................... | G05D 1/0088 |

(Continued)

FOREIGN PATENT DOCUMENTS

JP 2016-031358 A 3/2016

*Primary Examiner* — Helen C Kwok
(74) *Attorney, Agent, or Firm* — Rankin, Hill & Clark LLP

(57) ABSTRACT

An inertial sensor module includes: a first inertial sensor having a first axis as a detection axis; and a second inertial sensor having the first axis as a detection axis, in which detection accuracy of the first inertial sensor is higher than detection accuracy of the second inertial sensor, and the operation circuit receives a detection signal of the first axis output from the first inertial sensor and a detection signal of the first axis output from the second inertial sensor, and selects and outputs either a first output signal based on the detection signal of the first axis output from the first inertial sensor or a second output signal based on the detection signal of the first axis output from the second inertial sensor.

11 Claims, 11 Drawing Sheets

(56) References Cited

U.S. PATENT DOCUMENTS

| | | | | |
|---|---|---|---|---|
| 2020/0378794 | A1* | 12/2020 | Yoda | E02F 9/264 |
| 2021/0270686 | A1* | 9/2021 | Rogers | G01P 15/0891 |
| 2022/0317146 | A1* | 10/2022 | Otani | G01P 15/18 |
| 2023/0078589 | A1* | 3/2023 | Sakuma | G01P 15/18 |
| | | | | 73/510 |
| 2023/0099306 | A1* | 3/2023 | Watanabe | G01P 15/18 |
| | | | | 73/488 |
| 2023/0099359 | A1* | 3/2023 | Mitsunaga | G01C 19/5776 |
| | | | | 73/514.02 |
| 2023/0100231 | A1* | 3/2023 | Matsuoka | G01P 21/00 |
| | | | | 73/514.32 |
| 2023/0125187 | A1* | 4/2023 | Nishio | G01P 15/125 |
| | | | | 257/787 |

\* cited by examiner

INERTIAL SENSOR MODULE

The present application is based on, and claims priority from JP Application Serial Number 2021-149261, filed Sep. 14, 2021, the disclosure of which is hereby incorporated by reference herein in its entirety.

BACKGROUND

1. Technical Field

The present disclosure relates to an inertial sensor module.

2. Related Art

JP-A-2016-31358 discloses an inertial sensor module including a three-axis acceleration sensor and a three-axis gyro sensor that are formed of a silicon substrate.

In recent years, a demand for high accuracy of inertial sensor modules has increased. For example, in a system that controls a posture of a vehicle, an inertial sensor module is mounted on the vehicle in order to calculate a roll angle, a pitch angle, and a yaw angle of the vehicle, and it is particularly necessary to accurately calculate the yaw angle. Therefore, an inertial sensor module that can detect a three-axis angular velocity and a one-axis angular velocity with high accuracy is desired. However, an inertial sensor module on which a three-axis silicon MEMS sensor is mounted may not meet the demand for high detection accuracy for a specific one axis.

SUMMARY

An aspect of an inertial sensor module according to the present disclosure includes: a first inertial sensor having a first axis as a detection axis; a second inertial sensor having the first axis as a detection axis; and an operation circuit in which detection accuracy of the first inertial sensor is higher than detection accuracy of the second inertial sensor, and the operation circuit receives a detection signal of the first axis output from the first inertial sensor and a detection signal of the first axis output from the second inertial sensor, and selects and outputs either a first output signal based on the detection signal of the first axis output from the first inertial sensor or a second output signal based on the detection signal of the first axis output from the second inertial sensor.

Another aspect of an inertial sensor module according to the present disclosure includes: a first inertial sensor having a first axis as a detection axis; a second inertial sensor having the first axis as a detection axis; and an operation circuit, in which detection accuracy of the first inertial sensor is higher than detection accuracy of the second inertial sensor, and the operation circuit receives a detection signal of the first axis output from the first inertial sensor and a detection signal of the first axis output from the second inertial sensor, and corrects the detection signal of the first axis output from the first inertial sensor when a magnitude of the detection signal of the first axis output from the second inertial sensor is within a predetermined range.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessary constituent elements of the present disclosure.

1. First Embodiment

Figure 1:
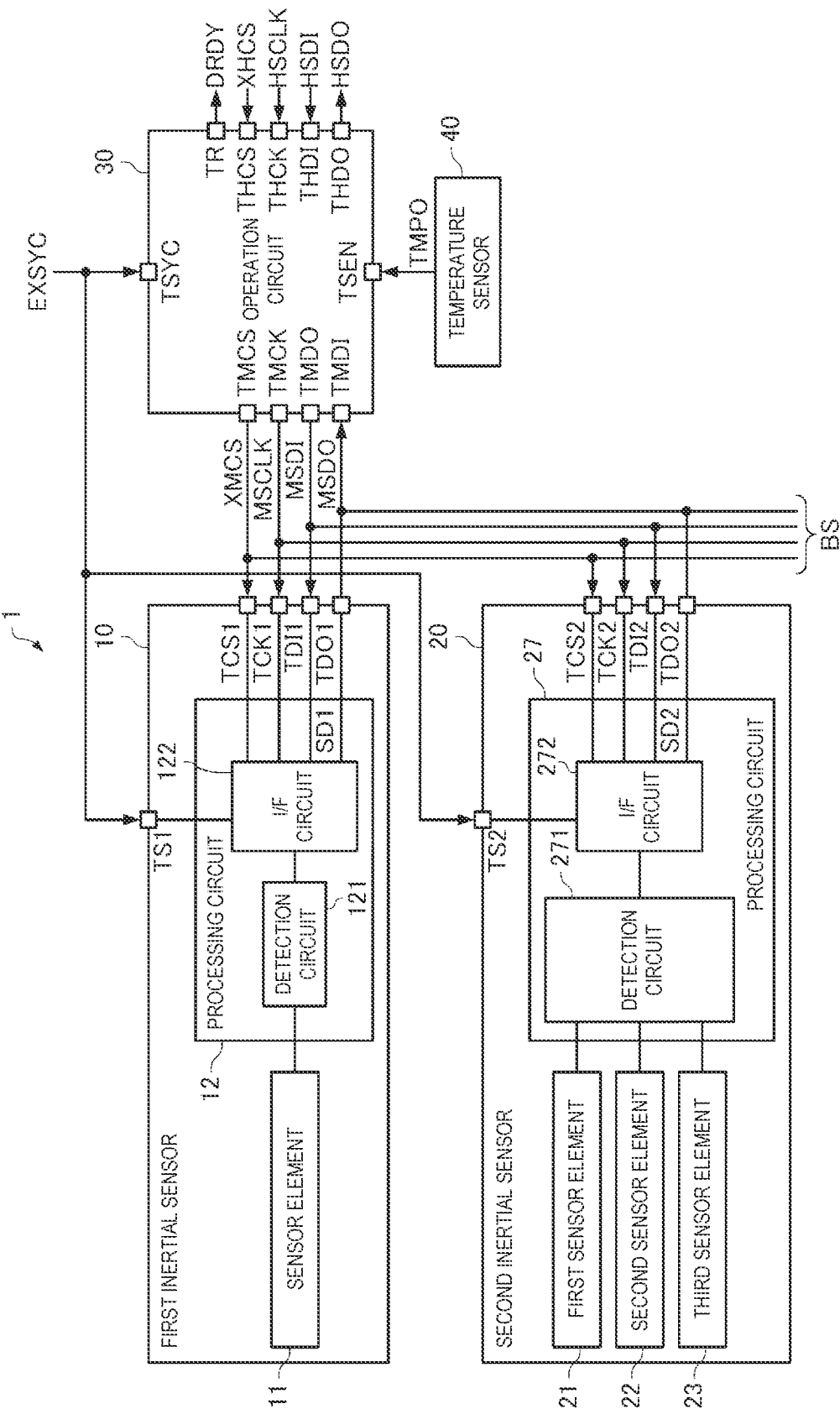
FIG. 1 is a diagram showing an example of a functional configuration of an inertial sensor module according to a first embodiment.

FIG. 1 is a diagram showing an example of a functional configuration of an inertial sensor module 1 according to a first embodiment. As shown in FIG. 1, the inertial sensor module 1 according to the first embodiment includes a first inertial sensor 10, a second inertial sensor 20, an operation circuit 30, and a temperature sensor 40. In the inertial sensor module 1, a part of the components in FIG. 1 may be omitted or changed, and other components may be added.

The first inertial sensor 10 is a sensor having a first axis as a detection axis, and includes a sensor element 11 and a processing circuit 12. The first inertial sensor 10 is a device accommodating in a package thereof a printed circuit board on which the sensor element 11 and the processing circuit 12 are mounted. The processing circuit 12 is, for example, an IC chip implemented by a semiconductor. The IC is an abbreviation for integrated circuit. The first inertial sensor 10 includes, for example, a terminal TCS1, a terminal TCK1, a terminal TDI1, a terminal TDO1, and a terminal TS1 which are terminals for external coupling provided in the package.

The second inertial sensor 20 is a sensor having a first axis, a second axis, and a third axis as detection axes, and includes a first sensor element 21, a second sensor element 22, a third sensor element 23, and a processing circuit 27. The second inertial sensor 20 is a device accommodating in a package thereof a silicon substrate on which the first sensor element 21, the second sensor element 22, the third sensor element 23, and the processing circuit 27 are formed. The processing circuit 27 is an IC formed on the silicon substrate. The second inertial sensor 20 includes, for example, a terminal TCS2, a terminal TCK2, a terminal TDI2, a terminal TDO2, and a terminal TS2 which are terminals for external coupling provided in the package.

The sensor element 11 and the first sensor element 21 are both sensor elements that detect the same type of physical quantity with the first axis as a detection axis. The physical quantity is, for example, an angular velocity, an acceleration, an angular acceleration, a velocity, a distance, a pressure, a sound pressure, or a magnetic quantity. For example, when three axes orthogonal to one another are defined as an X-axis, a Y-axis, and a Z-axis, the sensor element 11 and the first sensor element 21 may both detect an angular velocity around the Z-axis, or may both detect an acceleration in an X-axis direction.

The second sensor element 22 is a sensor element that detects a physical quantity with the second axis different from the first axis as a detection axis. The third sensor element 23 is a sensor element that detects a physical quantity with the third axis different from the first axis and the second axis as a detection axis. The physical quantities detected by the first sensor element 21, the second sensor element 22, and the third sensor element 23 may be of the same type or different types from one another. For example, the first sensor element 21 may detect the angular velocity around the Z-axis, the second sensor element 22 may detect an angular velocity around the X-axis, and the third sensor element 23 may detect an angular velocity around the Y-axis. Alternatively, the first sensor element 21 may detect the angular velocity around the Z-axis, the second sensor element 22 may detect an acceleration in the X-axis direction, and the third sensor element 23 may detect an acceleration in a Y-axis direction.

The processing circuit 12 performs physical quantity detection processing on a signal output from the sensor element 11, and outputs first detection data SD1 obtained by the detection processing. The processing circuit 12 includes a detection circuit 121 that performs physical quantity detection processing on the signal output from the sensor element 11, and an interface circuit 122 that outputs the first detection data SD1 obtained by the detection processing of the detection circuit 121. For example, the detection circuit 121 may include an amplifier circuit that amplifies the signal output from the sensor element 11, a wave detection circuit that detects an output signal of the amplifier circuit, a gain adjustment circuit that adjusts a voltage of an output signal of the wave detection circuit, an offset adjustment circuit that adjusts an offset of an output signal of the gain adjustment circuit, and an A/D conversion circuit that converts an output signal of the offset adjustment circuit into a digital signal. The interface circuit 122 receives the digital signal output from the A/D conversion circuit of the detection circuit 121 as the first detection data SD1 at the timing of an external synchronization signal EXSYC received from the terminal TCS1, and outputs the first detection data SD1 in accordance with a read command from the operation circuit 30. The first detection data SD1 includes a detection signal of the first axis obtained by the sensor element 11.

The processing circuit 27 performs physical quantity detection processing on signals output from the first sensor element 21, the second sensor element 22, and the third sensor element 23, and outputs second detection data SD2 obtained by the detection processing. The processing circuit 27 includes a detection circuit 271 that performs physical quantity detection processing on signals output from the first sensor element 21, the second sensor element 22, and the third sensor element 23, and an interface circuit 272 that outputs the second detection data SD2 obtained by the detection processing of the detection circuit 121. For example, the detection circuit 271 may include three amplifier circuits that amplify signals output from the first sensor element 21, the second sensor element 22, and the third sensor element 23, respectively, three wave detection circuits that detect output signals of the respective amplifier circuits, three gain adjustment circuits that adjust voltages of output signals of the respective wave detection circuits, three offset adjustment circuits that adjust offsets of output signals of the respective gain adjustment circuits, and an A/D conversion circuit that converts an output signal of each offset adjustment circuit into a digital signal in a time division manner. The interface circuit 272 receives the digital signal output from the A/D conversion circuit of the detection circuit 271 as the second detection data SD2 at the timing of the external synchronization signal EXSYC received from the terminal TCS2, and outputs the second detection data SD2 in accordance with a read command from the operation circuit 30. The second detection data SD2 includes a detection signal of the first axis obtained by the first sensor element 21, a detection signal of the second axis obtained by the second sensor element 22, and a detection signal of the third axis obtained by the third sensor element 23.

The external synchronization signal EXSYC is a signal supplied from a host device or the like, and is a signal that is active at each synchronization timing. For example, the external synchronization signal EXSYC is a signal that is active at regular intervals. Active means to be at a high level in the case of positive logic and L level in the case of negative logic. The first inertial sensor 10 and the second inertial sensor 20 can generate the first detection data SD1 and the second detection data SD2 at an appropriate timing in which the first detection data SD1 and the second detection data SD2 are synchronized with each other using the external synchronization signal EXSYC, and output the first detection data SD1 and the second detection data SD2 to the operation circuit 30.

The inertial sensor module 1 includes a digital interface bus BS through which the first inertial sensor 10 and the second inertial sensor 20 are electrically coupled to the operation circuit 30.

The digital interface bus BS is a bus conforming to a communication standard of interface processing performed by the interface circuit 122 and the interface circuit 272. In the present embodiment, the digital interface bus BS is a bus conforming to an SPI communication standard, and includes two data signal lines, a clock signal line, and a chip select signal line. The SPI is an abbreviation for serial peripheral interface. Specifically, the first inertial sensor 10 is electrically coupled to the digital interface bus BS via the terminal TCS1, the terminal TCK1, the terminal TDI1, and the terminal TDO1. The second inertial sensor 20 is electrically coupled to the digital interface bus BS via the terminal TCS2, the terminal TCK2, the terminal TDI2, and the terminal TDO2. The operation circuit 30 is electrically coupled to the digital interface bus BS via a terminal TMCS, a terminal TMCK, a terminal TMDO, and a terminal TMDI. Here, the electrical coupling refers to coupling in which an electrical signal can be transmitted, and refers to coupling in which information can be transmitted by the electrical signal. However, the digital interface bus BS may be a bus conforming to an I2C communication standard, a communication standard developed from SPI or I2C, a communication standard obtained in which a part of the SPI or I2C standard is improved or modified, or the like. The I2C is an abbreviation for inter-integrated circuit.

The operation circuit 30 is a controller serving as a master for the first inertial sensor 10 and the second inertial sensor 20. The operation circuit 30 is an integrated circuit device, and is implemented by a processor such as an MPU or a CPU. Alternatively, the operation circuit 30 may be implemented by an ASIC using automatic placement and routing such as a gate array.

The operation circuit 30 outputs a chip select signal XMCS from the terminal TMCS, outputs a serial clock signal MSCLK from the terminal TMCK, and outputs a serial data signal MSDI from the terminal TMDO. The interface circuit 122 performs interface processing of the SPI communication standard based on the chip select signal XMCS received from the terminal TCS1, the serial clock signal MSCLK received from the terminal TCK1, and the serial data signal MSDI received from the terminal TDI1. When the serial data signal MSDI is a read command of the first detection data SD1, the interface circuit 122 outputs the first detection data SD1 to the terminal TDO1. The interface circuit 272 performs interface processing of the SPI communication standard based on the chip select signal XMCS received from the terminal TCS2, the serial clock signal MSCLK received from the terminal TCK2, and the serial data signal MSDI received from the terminal TDI2. When the serial data signal MSDI is a read command of the second detection data SD2, the interface circuit 272 outputs the second detection data SD2 to the terminal TDO2. The first detection data SD1 output from the terminal TDO1 of the first inertial sensor 10 and the second detection data SD2 output from the terminal TDO2 of the second inertial sensor 20 are input to the terminal TMDI of the operation circuit 30 as a serial data signal MSDO.

When receiving the external synchronization signal EXSYC from a terminal TSYC, the operation circuit 30 reads the first detection data SD1 and the second detection data SD2, and performs various operations on the first detection data SD1 and the second detection data SD2. Specifically, the operation circuit 30 performs a downsampling operation, a filter operation, a correction operation, and the like on the first detection data SD1 and the second detection data SD2. For example, as one of the correction operations, the operation circuit 30 performs a temperature correction operation on the first detection data SD1 and the second detection data SD2 based on a temperature signal TMPO received from a terminal TSEN. The temperature signal TMPO is output from the temperature sensor 40. For example, the temperature signal TMPO may be a digital signal whose frequency changes in accordance with the temperature, or may be a digital signal obtained by A/D converting an analog signal whose voltage changes in accordance with the temperature. Alternatively, the temperature sensor 40 may output the temperature signal TMPO whose voltage changes in accordance with the temperature, and the operation circuit 30 may convert the temperature signal TMPO into a digital signal by a built-in A/D conversion circuit to perform the temperature correction operation. The operation circuit 30 may perform an operation of calculating a posture and a position of the inertial sensor module 1 based on the first detection data SD1 and the second detection data SD2. The temperature sensor 40 may be provided in the first inertial sensor 10 or the second inertial sensor 20.

In the present embodiment, the operation circuit 30 receives a detection signal of the first axis output from the first inertial sensor 10 and a detection signal of the first axis output from the second inertial sensor 20, and selects and outputs either a first output signal of the first axis based on the detection signal of the first axis output from the first inertial sensor 10 or a second output signal of the first axis based on the detection signal of the first axis output from the second inertial sensor 20.

Specifically, the operation circuit 30 receives the first detection data SD1 including the detection signal of the first axis output from the first inertial sensor 10 and the second detection data SD2 including the detection signal of the first axis, a detection signal of the second axis, and a detection signal of the third axis output from the second inertial sensor 20. The operation circuit 30 generates the first output signal of the first axis based on the detection signal of the first axis output from the first inertial sensor 10 by the operation on the first detection data SD1. The operation circuit 30 generates the second output signal of the first axis based on the detection signal of the first axis output from the second inertial sensor 20, an output signal of the second axis based on the detection signal of the second axis output from the second inertial sensor 20, and an output signal of the third axis based on the detection signal of the third axis output from the second inertial sensor 20 by the operation on the second detection data SD2. The operation circuit 30 selects either the first output signal of the first axis or the second output signal of the first axis.

In the present embodiment, the operation circuit 30 selects and outputs either the first output signal of the first axis or the second output signal of the first axis in accordance with a range of motion acting on the first axis of the first inertial sensor 10 and the second inertial sensor 20. The motion acting on the first axis is a motion for which a physical quantity of the first axis is generated, and may be, for example, a rotational motion or a translational motion. The operation circuit 30 may select the first output signal of the first axis when a magnitude of the motion acting on the first axis is within a predetermined range, and may select the second output signal of the first axis when the magnitude of the motion acting on the first axis is not within the predetermined range. The motion acting on the first axis causes, for example, an angular velocity around the first axis, an acceleration in a first axis direction, vibration, and impact. When the first inertial sensor 10 is a sensor that detects an angular velocity or an acceleration of the first axis and the second inertial sensor 20 is a sensor that detects angular velocities or accelerations of the first axis, the second axis, and the third axis, the magnitude of the first output signal of the first axis and the magnitude of the second output signal of the first axis are correlated with the magnitude of the motion acting on the first axis. Therefore, the operation circuit 30 can select either the first output signal of the first axis or the second output signal of the first axis based on at least one of the magnitude of the first output signal of the first axis and the magnitude of the second output signal of the first axis.

When the first output signal of the first axis is selected, the operation circuit 30 outputs the first output signal of the first axis, the output signal of the second axis, and the output signal of the third axis to outside in synchronization with one another. When the second output signal of the first axis is selected, the operation circuit 30 outputs the second output signal of the first axis, the output signal of the second axis, and the output signal of the third axis to outside in synchronization with one another. Specifically, the operation circuit 30 generates third-axis output data including the first output signal of the first axis, the output signal of the second axis, and the output signal of the third axis, which are synchronized with one another, or third-axis output data including the second output signal of the first axis, the output signal of the second axis, and the output signal of the third axis, which are synchronized with one another, and outputs the generated third-axis output data to a host device (not shown).

In the present embodiment, the operation circuit 30 is electrically coupled to the host device via a terminal TR, a terminal THCS, a terminal THCK, a terminal THDI, and a terminal THDO. The host device is a controller serving as a master for the operation circuit 30. Upon completion of the generation of the third-axis output data, the operation circuit 30 outputs a signal DRDY indicating the completion of preparation of the third-axis output data from the terminal TR to the host device. When receiving the signal DRDY, the host device outputs a chip select signal XHCS, a serial clock signal HSCLK, and a serial data signal HSDI in accordance with the SPI communication standard to the operation circuit 30. The serial data signal HSDI is a read command of three-axis output data. The operation circuit 30 performs interface processing of the SPI communication standard based on the chip select signal XHCS received from the terminal THCS, the serial clock signal HSCLK received from the terminal THCK, and the serial data signal HSDI received from the terminal THDI, and outputs the third-axis output data to the terminal THDO. The third-axis output data output from the terminal THDO of the operation circuit 30 is input to the host device as a serial data signal HSDO.

Figure 2:
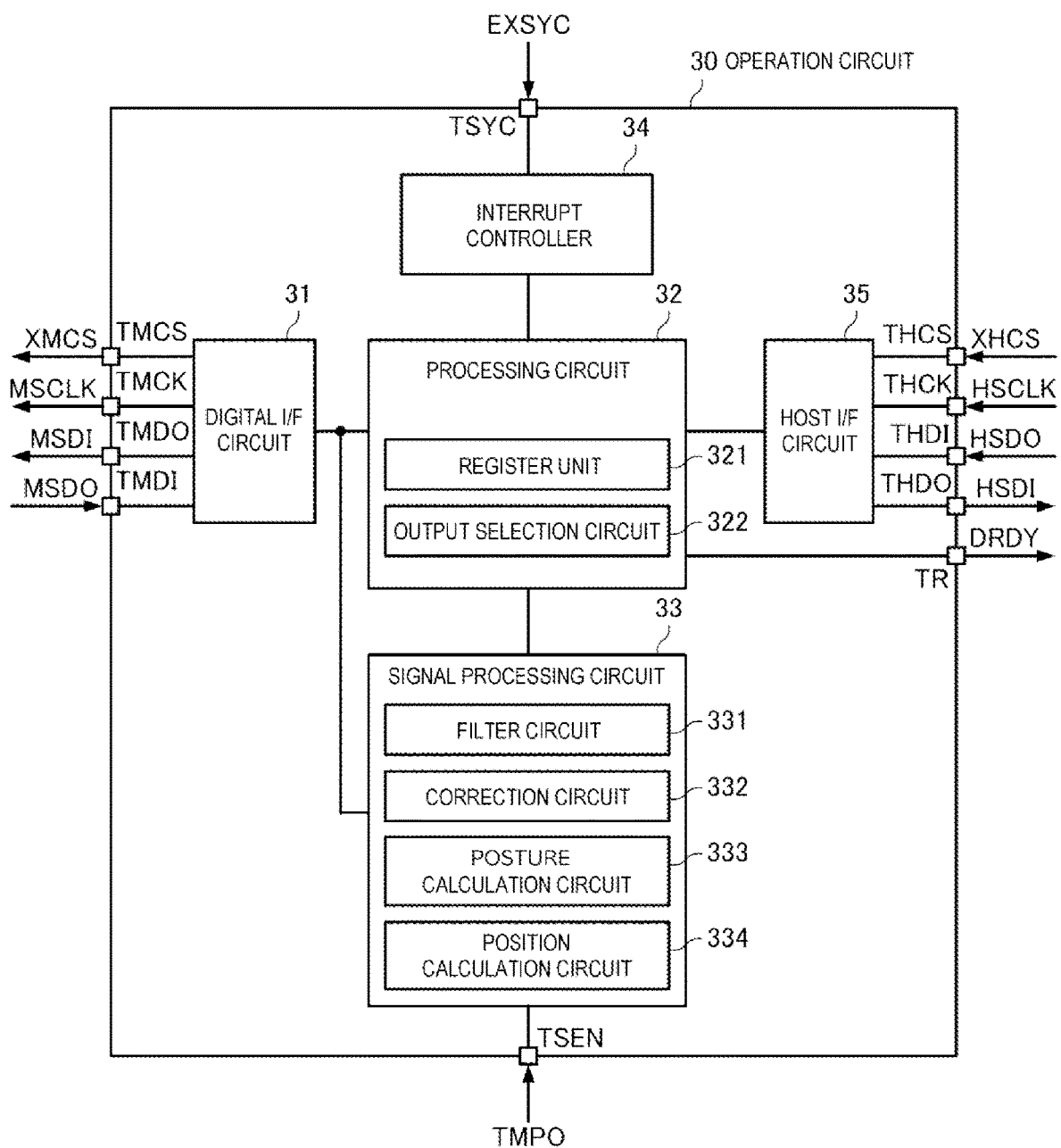
FIG. 2 is a diagram showing a configuration example of an operation circuit.

FIG. 2 is a diagram showing a configuration example of the operation circuit 30. As shown in FIG. 2, the operation circuit 30 includes a digital interface circuit 31, a processing circuit 32, a signal processing circuit 33, an interrupt controller 34, and a host interface circuit 35.

The digital interface circuit 31 is a circuit that performs interface processing with the first inertial sensor 10 and the second inertial sensor 20. That is, the digital interface circuit 31 performs interface processing as a master between the interface circuit 122 and the interface circuit 272. The digital interface circuit 31 is coupled to the digital interface bus BS via the terminal TMCS, the terminal TMCK, the terminal TMDO, and the terminal TMDI. In the present embodiment, the digital interface circuit 31 performs interface processing of the SPI communication standard, similarly to the interface circuit 122 and the interface circuit 272. The digital interface circuit 31 may perform interface processing of, for example, an I2C communication standard, a communication standard developed from SPI or I2C, or a communication standard in which a part of the SPI or I2C standard is improved or modified. The digital interface bus BS and the digital interface circuit 31 may be commonly provided in the first inertial sensor 10 and the second inertial sensor 20, or may be provided in each of the first inertial sensor 10 and the second inertial sensor 20.

The host interface circuit 35 is a circuit that performs interface processing with the host device. That is, the host interface circuit 35 performs interface processing as a slave with the host device. The host interface circuit 35 performs interface processing of the SPI communication standard on the host device via the terminal THCS, the terminal THCK, the terminal THDO, and the terminal THDI. The host interface circuit 35 may perform interface processing of, for example, an I2C communication standard, a communication standard developed from SPI or I2C, or a communication standard in which a part of the SPI or I2C standard is improved or modified.

The processing circuit 32 is a circuit corresponding to a core CPU of the operation circuit 30, and executes various operations and controls. The processing circuit 32 includes a register unit 321 including various registers.

The signal processing circuit 33 is a circuit that performs digital signal processing such as various operations, and is implemented by a DSP or the like. The DSP is an abbreviation for digital signal processor. In the present embodiment, the signal processing circuit 33 includes a filter circuit 331 and a correction circuit 332. The filter circuit 331 performs a filter operation for reducing unnecessary signal components on the first detection data SD1 and the second detection data SD2. The correction circuit 332 performs various correction operations. For example, the correction circuit 332 performs a temperature correction operation on the first detection data SD1 and the second detection data SD2 based on the temperature signal TMPO received from the terminal TSEN and a temperature correction table stored in a memory (not shown). The correction circuit 332 may perform correction operations such as zero-point correction, sensitivity correction, and nonlinearity correction on the first detection data SD1 and the second detection data SD2. The signal processing circuit 33 may perform an operation of calculating a moving average of latest J pieces of the first detection data SD1 and the second detection data SD2 and then down-sampling the moving average to a rate of 1/K. J and K are integers of 2 or more.

The signal processing circuit 33 may include a posture calculation circuit 333 and a position calculation circuit 334. The posture calculation circuit 333 calculates the posture of the inertial sensor module 1 based on the detection signal of the first axis included in the first detection data SD1 or the second detection data SD2, the detection signal of the second axis included in the second detection data SD2, and the detection signal of the third axis included in the second detection data SD2. The position calculation circuit 334 calculates the position of the inertial sensor module 1 based on the detection signal of the first axis included in the first detection data SD1 or the second detection data SD2, the detection signal of the second axis included in the second detection data SD2, and the detection signal of the third axis included in the second detection data SD2.

The processing circuit 32 sets a detection signal of the first axis included in first detection data SD1 after the operation by the signal processing circuit 33 as a first output signal of the first axis. The processing circuit 32 sets a detection signal of the first axis included in second detection data SD2 after the operation by the signal processing circuit 33 as a first output signal of the first axis, sets a detection signal of the second axis as an output signal of the second axis, and sets a detection signal of the third axis as an output signal of the third axis.

The processing circuit 32 includes an output selection circuit 322. The output selection circuit 322 selects either the first output signal of the first axis or the second output signal of the first axis in accordance with the range of motion acting on the first axis based on at least one of the first output signal of the first axis and the second output signal of the first axis. When the first output signal of the first axis is selected, the output selection circuit 322 generates three-axis output data including the first output signal of the first axis, the output signal of the second axis, and the output signal of the third axis, which are synchronized with one another, and stores the three-axis output data in a data register of the register unit 321. When the second output signal of the first axis is selected, the output selection circuit 322 generates three-axis output data including the second output signal of the first axis, the output signal of the second axis, and the output signal of the third axis, which are synchronized with one another, and stores the three-axis output data in a data register of the register unit 321.

Further, the processing circuit 32 generates the signal DRDY indicating the completion of preparation of the third-axis output data, and outputs the signal DRDY to the host device via the terminal TR.

The register unit 321 includes a plurality of registers accessible by the host device. For example, the host device outputs the chip select signal XHCS and the serial clock signal HSCLK to the terminal THCS and the terminal THCK, respectively, and outputs the serial data signal HSDO, which is a read command of the third-axis output data, to the terminal THDI. Therefore, the host device can access the data register of the register unit 321 via the host interface circuit 35 and read the third-axis output data output as the serial data signal HSDI from the terminal THDO. The processing circuit 32 counts an update count of the data register of the third-axis output data, and writes the obtained update count to an update count register of the register unit 321. By reading the update count stored in the update count register together with the third-axis output data, the host device can specify the number of the read third-axis output data.

The interrupt controller 34 receives various interrupt requests. The interrupt controller 34 outputs a signal indicating an interrupt request, an interrupt level, and a vector number to the processing circuit 32 according to a priority and the interrupt level. When receiving the external synchronization signal EXSYS as one of interrupt request signals via the terminal TSYC, and the interrupt request by the external sync signal EXSYS, the interrupt controller 34 executes corresponding interruption.

Figure 3:
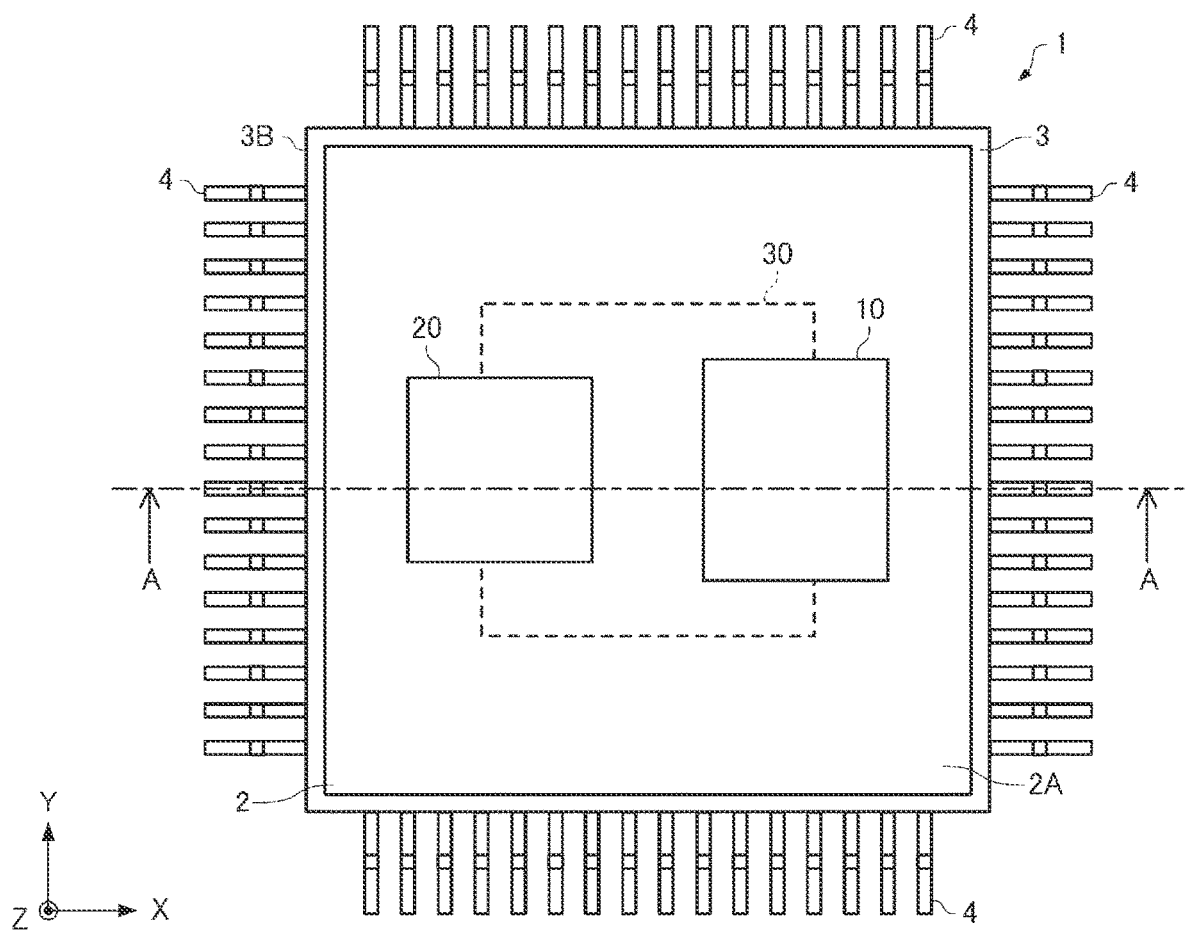
FIG. 3 is a plan view of the inertial sensor module.
Figure 4:
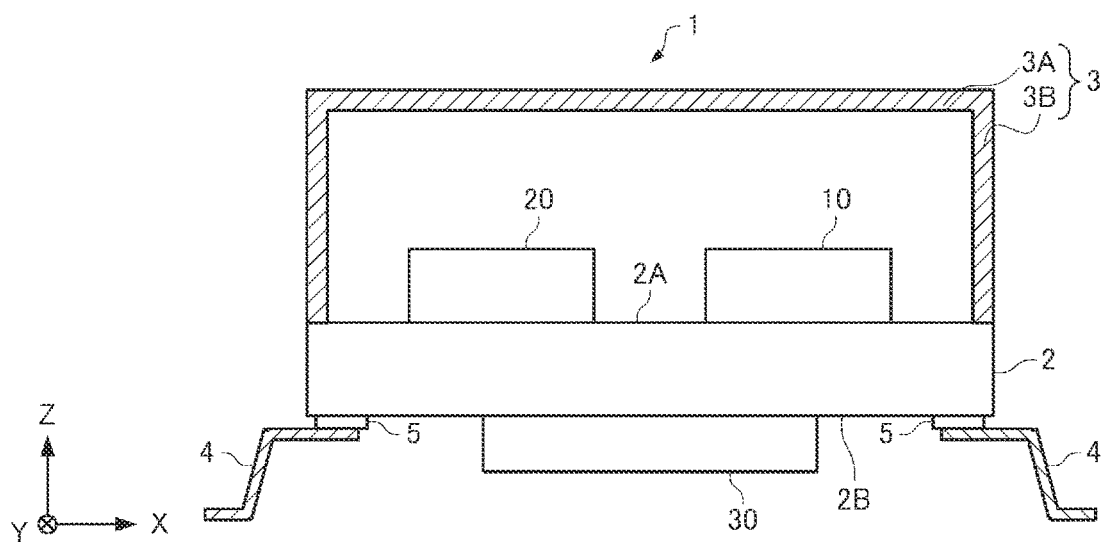
FIG. 4 is a cross-sectional view of the inertial sensor module taken along a line A-A of FIG. 3.
Figure 5:
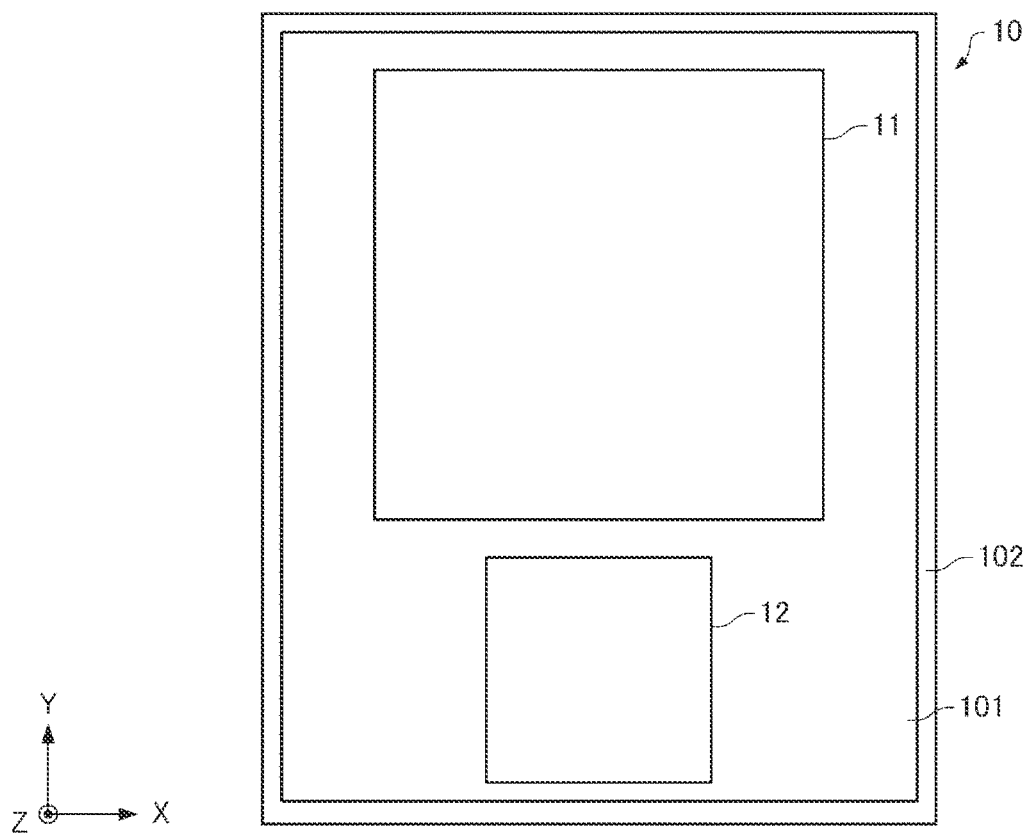
FIG. 5 is a plan view of a first inertial sensor.
Figure 6:
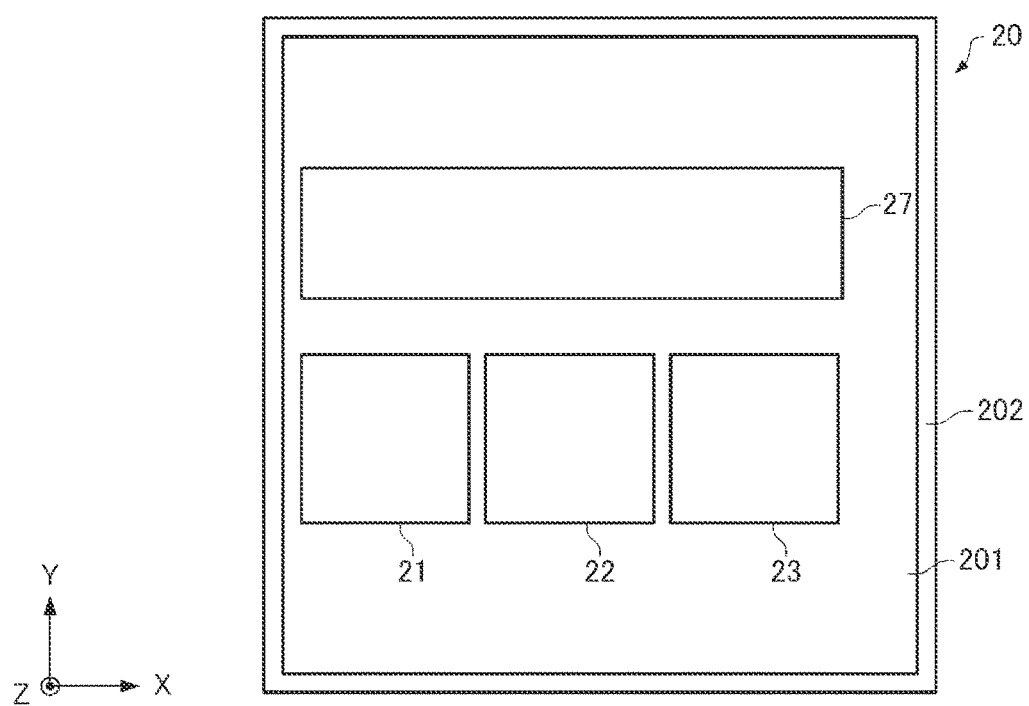
FIG. 6 is a plan view of a second inertial sensor.

FIGS. 3 to 6 are views showing an example of a structure of the inertial sensor module 1 according to the present embodiment. FIG. 3 is a plan view of the inertial sensor module 1. FIG. 4 is a cross-sectional view of the inertial sensor module 1 taken along a line A-A of FIG. 3. FIG. 5 is a plan view of the first inertial sensor 10. FIG. 6 is a plan view of the second inertial sensor 20. For convenience of description of an internal configuration of the inertial sensor module 1, FIG. 3 shows a state in which a top plate portion 3A of a metal cap 3 is removed. In FIG. 5, for convenience of description of the internal configuration of the first inertial sensor 10, components other than the sensor element 11 and the processing circuit 12 are not shown. Similarly, in FIG. 6, for convenience of description of the internal configuration of the second inertial sensor 20, components other than the first sensor element 21, the second sensor element 22, the third sensor element 23, and the processing circuit 27 are not shown. A dimensional ratio of each component in each drawing is different from the actual one.

Hereinafter, three axes orthogonal to one another will be described as the X-axis, the Y-axis, and the Z-axis. A direction along the X-axis is defined as an "X direction", a direction along the Y-axis is defined as a "Y direction", and a direction along the Z-axis is defined as a "Z direction", in each of which a direction indicated by an arrow is a plus direction. In addition, the plus direction in the Z direction is referred to as "up" or "upward", and a minus direction in the Z direction is referred to as "down" or "downward". Further, in a plan view from the Z direction, a surface at a plus side in the Z direction is referred to as an upper surface, and a surface at a minus side in the Z direction which is at an opposite side from the upper surface is referred to as a lower surface. The Z-axis is an example of the first axis, the X-axis is an example of the second axis, and the Y-axis is an example of the third axis.

As shown in FIGS. 3 and 4, the inertial sensor module 1 includes a printed circuit board 2, the metal cap 3 bonded to a main surface 2A which is an upper surface of the printed circuit board 2, the first inertial sensor 10 and the second inertial sensor 20 that are provided on the main surface 2A of the printed circuit board 2 and that are accommodated between the main surface 2A and the metal cap 3, the operation circuit 30 that is an integrated circuit device and that is mounted on a lower surface 2B of the printed circuit board 2, and a plurality of lead terminals 4 electrically coupled to the lower surface 2B of the printed circuit board 2.

The printed circuit board 2 has a rectangular plate shape in the plan view from the Z direction orthogonal to the main surface 2A of the printed circuit board 2. As the printed circuit board 2, for example, a ceramic substrate or a glass epoxy substrate can be used. In FIGS. 3 and 4, a wiring formed on the printed circuit board 2 is not shown.

As shown in FIGS. 3 and 4, the metal cap 3 is bonded to the main surface 2A of the printed circuit board 2 via an adhesive member (not shown). The metal cap 3 includes the top plate portion 3A and a side wall 3B extending downward from an outer peripheral edge of the top plate portion 3A, and has a rectangular shape substantially similar to the shape of the printed circuit board 2 in the plan view from the Z direction. The metal cap 3 may be formed of, for example, a 42 alloy which is an iron-nickel alloy.

The first inertial sensor 10 and the second inertial sensor 20 are provided on the main surface 2A of the printed circuit board 2. Since the metal cap 3 is bonded to the main surface 2A of the printed circuit board 2, the first inertial sensor 10 and the second inertial sensor 20 are accommodated between the main surface 2A of the printed circuit board 2 and the metal cap 3. In this manner, in the present embodiment, the first inertial sensor 10 and the second inertial sensor 20 are separated from each other.

As shown in FIGS. 3 and 4, the operation circuit 30, which is an integrated circuit device, is mounted on the lower surface 2B of the printed circuit board 2. The operation circuit 30 is electrically coupled to the first inertial sensor 10 and the second inertial sensor 20 via the wiring (not shown) provided on the printed circuit board 2. The operation circuit 30 is obtained by, for example, molding a bare chip which is a semiconductor chip.

An external coupling terminal 5 electrically coupled to the operation circuit 30 via the wiring (not shown) is provided on the lower surface 2B of the printed circuit board 2. Further, the plurality of lead terminals 4 are provided on the lower surface 2B of the printed circuit board 2 along four sides of the printed circuit board 2. Each lead terminal 4 is electrically coupled to the external coupling terminal 5 via a conductive bonding member such as solder (not shown).

The first inertial sensor 10 is a one-axis inertial sensor that detects a physical quantity of a desired detection axis among the three axes of the X-axis, the Y-axis, and the Z-axis with high accuracy. Here, it is assumed that the first inertial sensor 10 detects the angular velocity around the Z-axis. As shown in FIG. 5, the first inertial sensor 10 has a rectangular profile in the plan view from the Z direction. The first inertial sensor 10 includes a printed circuit board 101, the sensor element 11 mounted on the printed circuit board 101 and having the first axis as the detection axis, the processing circuit 12 that is an integrated circuit device and that is mounted on the printed circuit board 101, and a package 102 accommodating the printed circuit board 101 on which the sensor element 11 and the processing circuit 12 are mounted. The sensor element 11 detects the angular velocity around the Z-axis, which is the first axis. The sensor element 11 and the processing circuit 12 are electrically coupled to each other. In FIG. 5, a wiring formed on an upper surface of the package 102 and the printed circuit board 101 is not shown.

The second inertial sensor 20 is a three-axis inertial sensor that detects a physical quantity with the three axes of the X-axis, the Y-axis, and the Z-axis as detection axes. Here, it is assumed that the second inertial sensor 20 detects the angular velocity around the X-axis, the angular velocity around the Y-axis, and the angular velocity around the Z-axis. As shown in FIG. 6, the second inertial sensor 20 has a rectangular profile in the plan view from the Z direction. The second inertial sensor 20 includes a silicon substrate 201, the first sensor element 21 formed on the silicon substrate 201 and having the first axis as the detection axis, the second sensor element 22 formed on the silicon substrate 201 and having the second axis as the detection axis, the third sensor element 23 formed on the silicon substrate 201 and having the third axis as the detection axis, the processing circuit 27 that is an integrated circuit and that is formed on the silicon substrate 201, and a package 202 accommodating the silicon substrate 201 on which the first sensor element 21, the second sensor element 22, the third sensor element 23, and the processing circuit 27 are formed. The first sensor element 21 detects the angular velocity around the Z-axis which is the first axis. The second sensor element 22 detects the angular velocity around the X-axis which is the second axis. The third sensor element 23 detects the angular velocity around the Y-axis which is the third axis. The first sensor element 21, the second sensor element 22, and the third sensor element 23 are electrically coupled to the processing circuit 27. In FIG. 6, a wiring formed on an upper surface of the package 202 and the silicon substrate 201 is not shown.

Here, in the present embodiment, detection accuracy of the first inertial sensor 10 is higher than detection accuracy of the second inertial sensor 20. For example, the sensor element 11 included in the first inertial sensor 10 is an element made of a crystal, whereas the first sensor element 21, the second sensor element 22, and the third sensor element 23 included in the second inertial sensor 20 are elements formed of the silicon substrate 201 using a MEMS technique. Since the first inertial sensor 10 including the sensor element 11 has high frequency-temperature characteristics and high frequency stability and low noise and jitter, the first inertial sensor 10 is more expensive but has higher detection accuracy as compared with the second inertial sensor 20 including the first sensor element 21, the second sensor element 22, and the third sensor element 23.

In the present embodiment, a detection signal detected by the first inertial sensor 10 having detection accuracy higher than that of the second inertial sensor 20 is used for the angular velocity around the Z-axis that requires particularly high detection accuracy, and a detection signal detected by the inexpensive second inertial sensor 20 having detection accuracy lower than that of the first inertial sensor 10 is used for the angular velocity around the X-axis and the angular velocity around the Y-axis that may require relatively low detection accuracy as compared with the angular velocity around the Z-axis.

However, as for a range in which the linearity of the output with respect to the input is satisfied due to a difference in the material or structure between the sensor element 11 and the first sensor element 21, a detection signal of the angular velocity around the Z-axis output from the second inertial sensor 20 may be larger than a detection signal of the angular velocity around the Z-axis output from the first inertial sensor 10.

Figure 7:
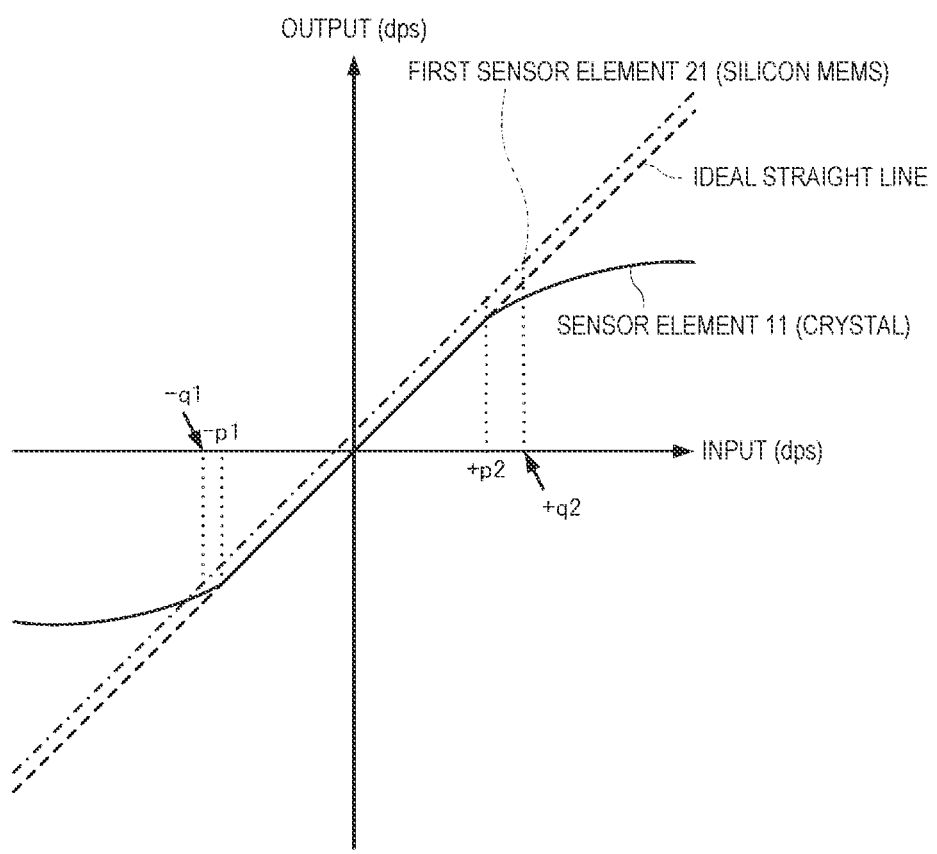
FIG. 7 is a diagram showing an example of input and output characteristics of a sensor element and a first sensor element.

FIG. 7 is a diagram showing an example of input and output characteristics of the sensor element 11 which is a crystal element and the first sensor element 21 which is a silicon MEMS element. In FIG. 7, a solid line indicates the input and output characteristics of the sensor element 11, and a dashed line indicates the input and output characteristics of the first sensor element 21. A horizontal axis represents an angular velocity acting on the Z-axis, and a vertical axis represents an angular velocity detected by the sensor element 11 and the first sensor element 21. The example of FIG. 7 shows the input and output characteristics of output signals of the sensor element 11 and the first sensor element 21 after sensitivity correction and offset correction, and a broken line indicates an ideal straight line for input and output.

In the example of FIG. 7, the input and output characteristics of the sensor element 11 have almost no offset error. Linearity of the input and output characteristics of the sensor element 11 is excellent when the angular velocity acting on the Z-axis is in a range from −p1 [dps] to +p2 [dps], and is reduced when the angular velocity acting on the Z-axis is in a range smaller than −p1 [dps] or larger than +p2 [dps]. On the other hand, the input and output characteristics of the first sensor element 21 have a larger offset error than the input and output characteristics of the sensor element 11, and a range in which the linearity is satisfied is wider than the input and output characteristics of the sensor element 11. Therefore, an error of the input and output characteristics of the sensor element 11 with respect to the ideal straight line is smaller when the angular velocity acting on the Z-axis is in a range from −q1 [dps] to +q2 [dps], and an error of the input and output characteristics of the first sensor element 21 with respect to the ideal straight line is smaller when the angular velocity acting on the Z-axis is in a range smaller than −q1 [dps] or larger than +q2 [dps].

Therefore, when the angular velocity around the Z-axis is larger than −q1 [dps] or more or smaller than +q2 [dps] or less, the operation circuit 30 selects and outputs a first output signal of the Z-axis based on the detection signal output from the sensor element 11; when the angular velocity around the Z-axis is smaller than −q1 [dps] or larger than +q2 [dps], the operation circuit 30 selects and outputs a second output signal of the Z-axis based on the detection signal output from the first sensor element 21. That is, the operation circuit 30 selects the one having a smaller error with respect to the ideal straight line between the first output signal of the Z-axis and the second output signal of the Z-axis in accordance with a range of the rotational motion acting on the Z-axis, that is, in accordance with the range of the angular velocity acting on the Z-axis. The operation circuit 30 may use either the first output signal of the Z-axis or the second output signal of the Z-axis to specify the angular velocity acting on the Z-axis, and may use the second output signal of the Z-axis that has good linearity with respect to an input angular velocity in a wider range.

In this manner, in the present embodiment, the operation circuit 30 selects either the first output signal of the Z-axis based on the detection signal of the Z-axis output from the first inertial sensor 10 or the second output signal of the Z-axis based on the detection signal of the Z-axis output from the second inertial sensor 20 to be an output signal of the Z-axis in accordance with the range of the motion acting on the Z-axis, generates three-axis output data including the output signal of the Z-axis, an output signal of the X-axis based on a detection signal of the X-axis output from the second inertial sensor 20, and an output signal of the Y-axis based on a detection signal of the Y-axis output from the second inertial sensor 20, and outputs the three-axis output data to the host device.

The first inertial sensor 10 having high detection accuracy may be a quartz crystal sensor that detects an angular velocity around two or more axes, and in the present embodiment, the first inertial sensor 10 only detects an angular velocity around one axis in order to reduce a cost. The second inertial sensor 20 does not necessarily detect an angular velocity around the first axis, and the second inertial sensor 20 detects angular velocities around three axes in the present embodiment since a silicon MEMS sensor that detects angular velocities around three axes is in large demand and can be obtained at a low cost.

As described above, according to the inertial sensor module 1 in the first embodiment, since the detection accuracy of the first inertial sensor 10 is higher than the detection accuracy of the second inertial sensor 20, the operation circuit 30 selects and outputs the first output signal of the first axis based on the detection signal of the first axis output from the first inertial sensor 10, thereby achieving high detection accuracy for the first axis. According to the inertial sensor module 1 in the first embodiment, in a situation in which the detection accuracy of the first inertial sensor 10 is significantly reduced, the operation circuit 30 selects and outputs the second output signal of the first axis based on the detection signal of the first axis output from the second inertial sensor 20, thereby reducing the possibility that the detection accuracy for the first axis is significantly reduced.

In particular, in the inertial sensor module 1 according to the first embodiment, the operation circuit 30 selects and outputs either the first output signal of the first axis or the second output signal of the first axis in accordance with the range of motion acting on the first axis of the first inertial sensor 10 and the second inertial sensor 20. Therefore, according to the inertial sensor module 1 in the first embodiment, in the range of motion in which the detection accuracy of the first inertial sensor 10 is high, the operation circuit 30 selects and outputs the first output signal of the first axis, thereby achieving high detection accuracy for the first axis. In the range of the motion in which the detection accuracy of the first inertial sensor 10 is significantly reduced, the operation circuit 30 selects and outputs the second output signal of the first axis, thereby reducing the possibility that the detection accuracy for the first axis is significantly reduced.

According to the inertial sensor module 1 in the first embodiment, since the second inertial sensor 20 is a silicon MEMS sensor, a manufacturing cost of the second inertial sensor 20 is reduced, and thus cost reduction is achieved.

According to the inertial sensor module 1 in the first embodiment, since the first inertial sensor 10 has the first axis as the detection axis, and the second inertial sensor 20 has the first axis, the second axis, and the third axis as the detection axes, output signals of three axes in which the accuracy of an output signal of the first axis is higher than the accuracy of each of the output signals of the second axis and the third axis is obtained. Therefore, by using the inertial sensor module 1 according to the first embodiment, it is possible to implement a system in which higher detection accuracy is required for a specific one axis than the other two axes while preventing unnecessary costs.

2. Second Embodiment

Hereinafter, in a second embodiment, the same components as those in the first embodiment are denoted by the same reference numerals, the description overlapping with the first embodiment is omitted or simplified, and contents different from those in the first embodiment will be mainly described.

Since a functional configuration of the inertial sensor module 1 according to the second embodiment is the same as that in FIG. 1, the illustration thereof is omitted. Since a structure of the inertial sensor module 1 according to the second embodiment is the same as that in FIGS. 3 to 6, the illustration thereof is omitted. The inertial sensor module 1 according to the second embodiment is different from the inertial sensor module 1 according to the first embodiment in a function and a configuration of the operation circuit 30.

In the second embodiment, the operation circuit 30 selects and outputs either the first output signal of the first axis based on the detection signal of the first axis output from the first inertial sensor 10 or the second output signal of the first axis based on the detection signal of the first axis output from the second inertial sensor 20 in accordance with the temperature. For example, the operation circuit 30 may detect the temperature based on the temperature signal TMPO received from the terminal TSEN, select the first output signal of the first axis when the temperature is within a predetermined range, and select the second output signal of the first axis when the temperature is not within the predetermined range.

Figure 8:
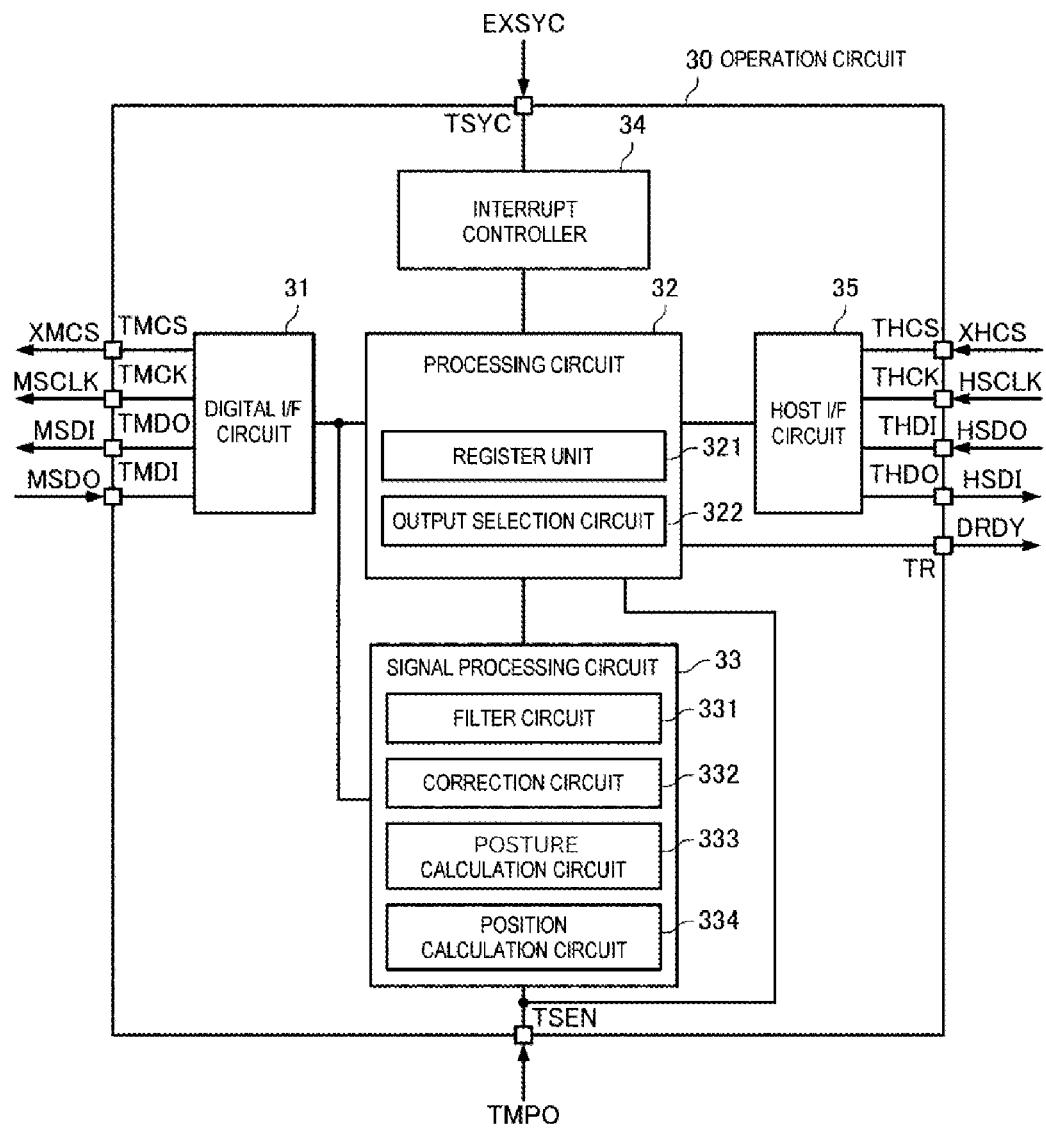
FIG. 8 is a diagram showing a configuration example of an operation circuit according to a second embodiment.

FIG. 8 is a diagram showing a configuration example of the operation circuit 30 included in the inertial sensor module 1 according to the second embodiment. As shown in FIG. 8, as in the first embodiment, the operation circuit 30 according to the second embodiment includes the digital interface circuit 31, the processing circuit 32, the signal processing circuit 33, the interrupt controller 34, and the host interface circuit 35. Since the functions of the digital interface circuit 31, the signal processing circuit 33, the interrupt controller 34, and the host interface circuit 35 are the same as those in the first embodiment, the description thereof will be omitted.

In the present embodiment, as in the first embodiment, the processing circuit 32 includes the register unit 321 and the output selection circuit 322. The output selection circuit 322 receives the temperature signal TMPO from the terminal TSEN, detects the temperature based on the temperature signal TMPO, and selects either the first output signal of the first axis based on the detection signal of the first axis included in the first detection data SD1 or the second output signal of the first axis based on the detection signal of the first axis included in the second detection data SD2 in accordance with the temperature.

Here, in the present embodiment, the correction circuit 332 of the signal processing circuit 33 performs a temperature correction operation on the first detection data SD1 and the second detection data SD2 based on the temperature signal TMPO and the temperature correction table. In order to improve the detection accuracy in a predetermined temperature range, a temperature table is created in advance so that an error with respect to a true value of the first output signal of the first axis in the predetermined temperature range is fairly small. Therefore, when the temperature deviates significantly from the predetermined temperature range, the error of the first output signal of the first axis is large. Therefore, when the temperature table is created so that an error of the second output signal of the first axis is smaller than the maximum error of the first output signal of the first axis over the entire target temperature range, the error of the second output signal of the first axis is smaller than the error of the first output signal of the first axis when the temperature greatly deviates from the predetermined temperature range.

Figure 9:
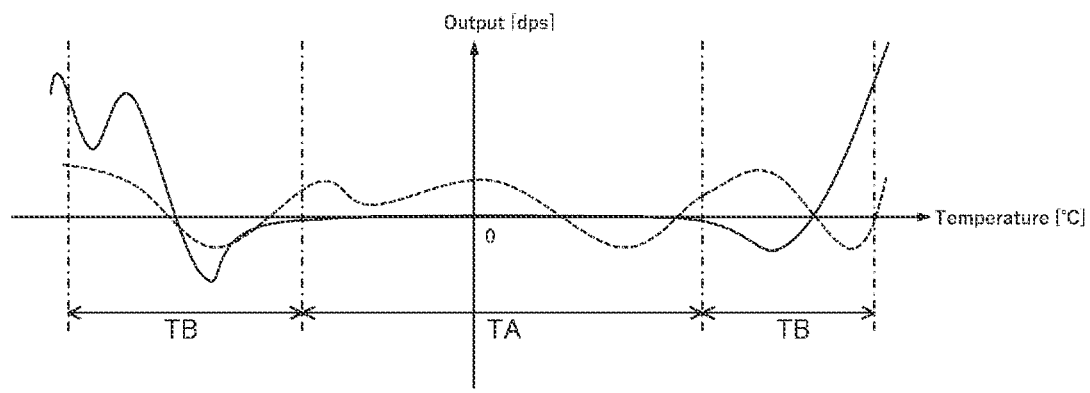
FIG. 9 is a diagram showing an example of temperature characteristics of the sensor element and the first sensor element.

FIG. 9 is a diagram showing an example of temperature characteristics after temperature correction of the sensor element 11 which is a crystal element and the first sensor element 21 which is a silicon MEMS element. In FIG. 9, a solid line indicates the temperature characteristic of the sensor element 11 after the temperature correction, and a dashed line indicates the temperature characteristic of the first sensor element 21 after the temperature correction. The horizontal axis represents the temperature, and the vertical axis represents an angular velocity around the first axis after the temperature correction detected by the sensor element 11 and the first sensor element 21. The example of FIG. 9 shows a temperature characteristic when the angular velocity acting on the first axis is 0. In the example of FIG. 9, due to the temperature characteristic of the sensor element 11 after the temperature correction, the error of the first output signal of the first axis in a predetermined temperature range TA is substantially 0, while the error thereof is large in a temperature range TB that deviates from the temperature range TA. On the other hand, due to the temperature characteristic of the first sensor element 21, the second output signal of the first axis has a large error in the temperature range TA, and the error is controlled within a certain range over the temperature ranges TA and TB. Therefore, for example, the output selection circuit 322 selects the first output signal of the first axis when the temperature specified based on the temperature signal TMPO is within the temperature range TA, and selects the second output signal of the first axis when the temperature is within the temperature range TB.

Alternatively, the output selection circuit 322 may select either the first output signal of the first axis or the second output signal of the first axis in accordance with the range of the motion acting on the first axis and the temperature. In this case, for example, when the error of the first output signal of the first axis with respect to the ideal straight line is smaller than the error of the second output signal of the first axis in a case of the motion acting on the first axis in a first range of motion, and the error of the first output signal of the first axis is substantially 0 in a case of the temperature in a first temperature range, the output selection circuit 322 may select the first output signal of the first axis when the motion acting on the first axis is in the first range of motion and the temperature is in the first temperature range, and may select the second output signal of the first axis in other cases. For example, the first range of motion is a range in which the angular velocity is −q1 or more and +q2 or less in the example of FIG. 7, and the first temperature range is the temperature range TA in the example of FIG. 9.

When the first output signal of the first axis is selected, the output selection circuit 322 generates three-axis output data including the first output signal of the first axis, the output signal of the second axis, and the output signal of the third axis, which are synchronized with one another, and stores the three-axis output data in a data register of the register unit 321. When the second output signal of the first axis is selected, the output selection circuit 322 generates three-axis output data including the second output signal of the first axis, the output signal of the second axis, and the output signal of the third axis, which are synchronized with one another, and stores the three-axis output data in a data register of the register unit 321. The host device can access the data register of the register unit 321 via the host interface circuit 35 and read the three-axis output data output as the serial data signal HSDI from the terminal THDO.

Since the other functions of the processing circuit 32 are the same as those in the first embodiment, the description thereof will be omitted.

The inertial sensor module 1 according to the second embodiment described above has the same effect as the inertial sensor module 1 according to the first embodiment.

Further, in the inertial sensor module 1 according to the second embodiment, the operation circuit 30 selects and outputs either the first output signal of the first axis or the second output signal of the first axis in accordance with the temperature. Therefore, according to the inertial sensor module 1 in the second embodiment, at a temperature at which the detection accuracy of the first inertial sensor 10 is high, the operation circuit 30 selects and outputs the first output signal of the first axis, thereby achieving high detection accuracy for the first axis. At a temperature at which the detection accuracy of the first inertial sensor 10 is significantly reduced, the operation circuit 30 selects and outputs the second output signal of the first axis, thereby reducing the possibility that the detection accuracy for the first axis is significantly reduced.

3. Third Embodiment

Hereinafter, in a third embodiment, the same components as those in the first embodiment or the second embodiment are denoted by the same reference numerals, repetitive description as that in the first embodiment or the second embodiment is omitted or simplified, and contents different from those in the first embodiment or the second embodiment will be mainly described.

Figure 10:
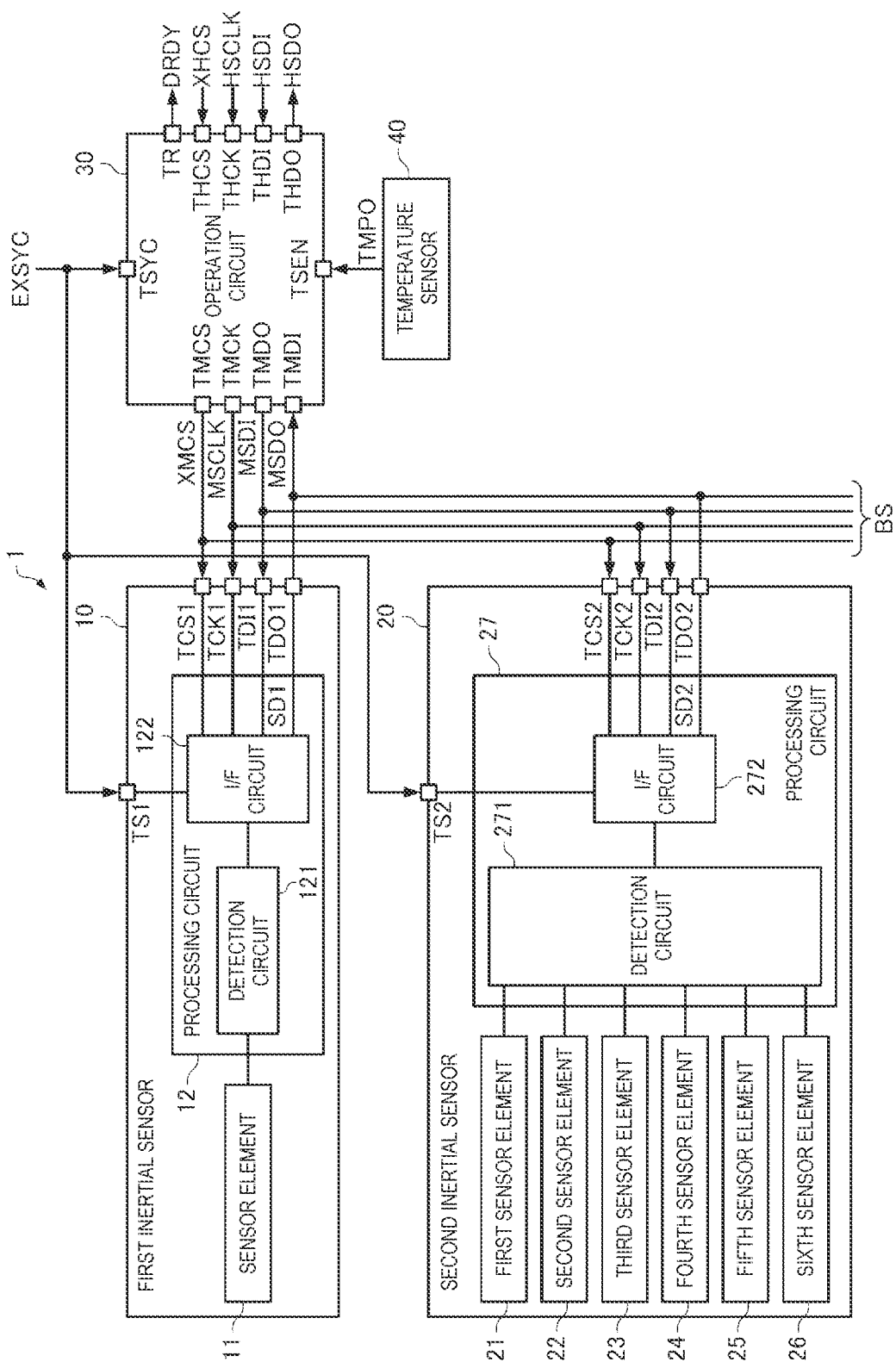
FIG. 10 is a diagram showing an example of a functional configuration of an inertial sensor module according to a third embodiment.

FIG. 10 is a diagram showing an example of a functional configuration of the inertial sensor module 1 according to the third embodiment. As shown in FIG. 10, as in the first embodiment or the second embodiment, the inertial sensor module 1 according to the third embodiment includes the first inertial sensor 10, the second inertial sensor 20, the operation circuit 30, and the temperature sensor 40. In the inertial sensor module 1, a part of components in FIG. 10 may be omitted or changed, and other components may be added.

In the third embodiment, a configuration of the second inertial sensor 20 is different from that in the first embodiment and the second embodiment. In the third embodiment, the second inertial sensor 20 is a sensor having the first axis, the second axis, and the third axis as detection axes and further having a fourth axis, a fifth axis, and a sixth axis as detection axes.

As shown in FIG. 10, the second inertial sensor 20 includes the first sensor element 21, the second sensor element 22, the third sensor element 23, the fourth sensor element 24, the fifth sensor element 25, the sixth sensor element 26, and the processing circuit 27. The second inertial sensor 20 is a device accommodating in a package thereof a silicon substrate on which the first sensor element 21, the second sensor element 22, the third sensor element 23, the fourth sensor element 24, the fifth sensor element 25, the sixth sensor element 26, and the processing circuit 27 are formed. Since the configurations and functions of the first sensor element 21, the second sensor element 22, and the third sensor element 23 are the same as those in the first embodiment and the second embodiment, the description thereof will be omitted.

The fourth sensor element 24 is a sensor element that detects a physical quantity with the fourth axis as a detection axis. The fifth sensor element 25 is a sensor element that detects a physical quantity with the fifth axis different from the fourth axis as a detection axis. The sixth sensor element 26 is a sensor element that detects a physical quantity using the sixth axis different from the fourth axis and the fifth axis as a detection axis. The physical quantities detected by the fourth sensor element 24, the fifth sensor element 25, the sixth sensor element 26 may be of the same type or different types from one another. The fourth axis, the fifth axis and the sixth axis may be the same axis as the first axis, the second axis and the third axis, respectively, or may be different axes. For example, the first sensor element 21 may detect the angular velocity around the Z-axis, the second sensor element 22 may detect the angular velocity around the X-axis, the third sensor element 23 may detect the angular velocity around the Y-axis, the fourth sensor element 24 may detect an acceleration in a Z-axis direction, the fifth sensor element 25 may detect the acceleration in the X-axis direction, and the sixth sensor element 26 may detect the acceleration in the Y-axis direction.

The processing circuit 27 performs physical quantity detection processing on signals output from the first sensor element 21, the second sensor element 22, the third sensor element 23, the fourth sensor element 24, the fifth sensor element 25, and the sixth sensor element 26, and outputs the second detection data SD2 obtained by the detection processing. The processing circuit 27 includes the detection circuit 271 that performs physical quantity detection processing on signals output from the first sensor element 21, the second sensor element 22, the third sensor element 23, the fourth sensor element 24, the fifth sensor element 25, and the sixth sensor element 26, and the interface circuit 272 that outputs the second detection data SD2 obtained by the detection processing of the detection circuit 121. For example, the detection circuit 271 may include six amplifier circuits that amplify signals output from the first sensor element 21, the second sensor element 22, the third sensor element 23, the fourth sensor element 24, the fifth sensor element 25, and the sixth sensor element 26, respectively, six wave detection circuits that detect output signals of the respective amplifier circuits, six gain adjustment circuits that adjust voltages of output signals of the respective wave detection circuits, six offset adjustment circuits that adjust offsets of output signals of the respective gain adjustment circuits, and an A/D conversion circuit that converts an output signal of each offset adjustment circuit into a digital signal in a time-division manner. The interface circuit 272 receives the digital signal output from the A/D conversion circuit of the detection circuit 271 as the second detection data SD2 at the timing of the external synchronization signal EXSYC received from the terminal TCS2, and outputs the second detection data SD2 in accordance with a read command from the operation circuit 30. The second detection data SD2 includes the detection signal of the first axis obtained by the first sensor element 21, the detection signal of the second axis obtained by the second sensor element 22, the detection signal of the third axis obtained by the third sensor element 23, a detection signal of the fourth axis obtained by the fourth sensor element 24, a detection signal of the fifth axis obtained by the fifth sensor element 25, and a detection signal of the sixth axis obtained by the sixth sensor element 26.

The operation circuit 30 generates an output signal of the first axis based on the detection signal of the first axis output from the first inertial sensor 10 by an operation on the first detection data SD1. The operation circuit 30 generates an output signal of the first axis based on the detection signal of the second axis output from the second inertial sensor 20, an output signal of the second axis based on the detection signal of the second axis output from the second inertial sensor 20, an output signal of the third axis based on the detection signal of the third axis output from the second inertial sensor 20, an output signal of the fourth axis based on the detection signal of the fourth axis output from the second inertial sensor 20, an output signal of the fifth axis based on the detection signal of the fifth axis output from the second inertial sensor 20, and an output signal of the sixth axis based on the detection signal of the sixth axis output from the second inertial sensor 20 by an operation on the second detection data SD2. The operation circuit 30 selects either the first output signal of the first axis or the second output signal of the first axis.

In the present embodiment, as in the first embodiment, the operation circuit 30 may select and output either the first output signal of the first axis or the second output signal of the first axis in accordance with the range of motion acting on the first axis of the first inertial sensor 10 and the second inertial sensor 20. As in the second embodiment, the operation circuit 30 may select and output either the first output signal of the first axis or the second output signal of the first axis in accordance with the temperature, or may select and output either the first output signal of the first axis or the second output signal of the first axis in accordance with the range of the motion acting on the first axis and the temperature.

When the first output signal of the first axis is selected, the operation circuit 30 generates six-axis output data including the first output signal of the first axis, the output signal of the second axis, the output signal of the third axis, the output signal of the fourth axis, the output signal of the fifth axis, and the output signal of the sixth axis, which are synchronized with one another. When the second output signal of the first axis is selected, the operation circuit 30 generates six-axis output data including the second output signal of the first axis, the output signal of the second axis, the output signal of the third axis, the output signal of the fourth axis, the output signal of the fifth axis, and the output signal of the sixth axis, which are synchronized with one another.

Upon completion of the generation of the six-axis output data, the operation circuit 30 outputs the signal DRDY indicating the completion of preparation of the six-axis output data from the terminal TR to the host device. When receiving the signal DRDY, the host device outputs the chip select signal XHCS, the serial clock signal HSCLK, and the serial data signal HSDI in accordance with the SPI communication standard to the operation circuit 30. The serial data signal HSDI is a read command of the six-axis output data. The operation circuit 30 performs interface processing of the SPI communication standard based on the chip select signal XHCS received from the terminal THCS, the serial clock signal HSCLK received from the terminal THCK, and the serial data signal HSDI received from the terminal THDI, and outputs the six-axis output data to the terminal THDO. The six-axis output data output from the terminal THDO of the operation circuit 30 is input to the host device as the serial data signal HSDO.

Further, as in the first embodiment or the second embodiment, the operation circuit 30 may perform a filter operation, correction operations such as temperature correction, zero-point correction, sensitivity correction, and nonlinearity correction, a downsampling operation, an operation of calculating a posture and a position of the inertial sensor module 1, and the like on the first detection data SD1 and the second detection data SD2.

A configuration example of the operation circuit 30 in the third embodiment is the same as that in FIG. 2 or FIG. 8, and thus illustration and description thereof are omitted.

Figure 11:
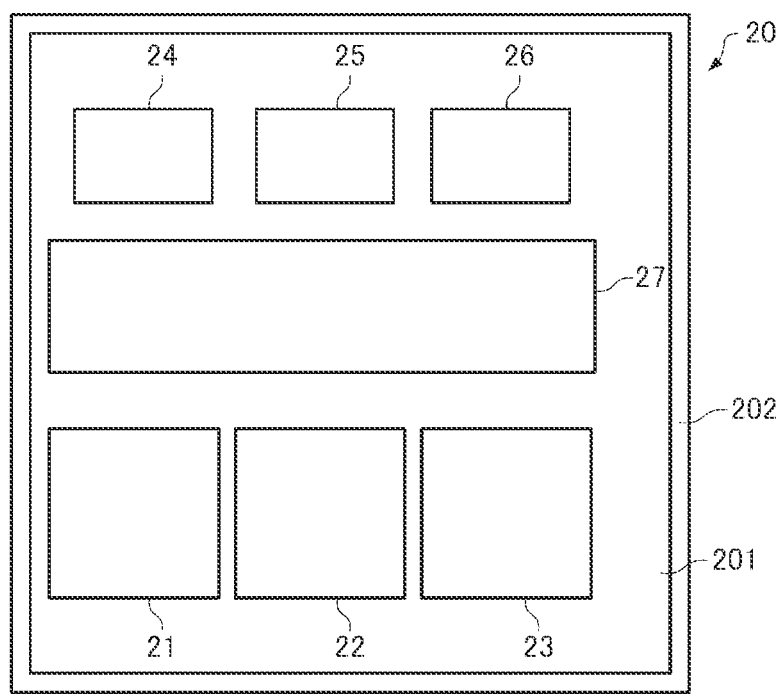
FIG. 11 is a plan view of a second inertial sensor according to the third embodiment.

FIG. 11 is a plan view of the second inertial sensor 20 according to the third embodiment. In FIG. 11, for convenience of description of the internal configuration of the second inertial sensor 20, components other than the first sensor element 21, the second sensor element 22, the third sensor element 23, the fourth sensor element 24, the fifth sensor element 25, the sixth sensor element 26, and the processing circuit 27 are not shown. A dimensional ratio of each component in FIG. 11 is different from the actual one.

The second inertial sensor 20 is, for example, a six-axis inertial sensor that detects angular velocities with three axes of the X-axis, the Y-axis, and the Z-axis as detection axes, and detects accelerations with three axes of the X-axis, the Y-axis, and the Z-axis as detection axes, respectively. As shown in FIG. 11, the second inertial sensor 20 has a rectangular profile in the plan view from the Z direction. The second inertial sensor 20 includes the silicon substrate 201, the first sensor element 21 formed on the silicon substrate 201 and having the first axis as the detection axis, the second sensor element 22 formed on the silicon substrate 201 and having the second axis as the detection axis, the third sensor element 23 formed on the silicon substrate 201 and having the third axis as the detection axis, the fourth sensor element 24 formed on the silicon substrate 201 and having the fourth axis as the detection axis, the fifth sensor element 25 formed on the silicon substrate 201 and having the fifth axis as the detection axis, the sixth sensor element 26 formed on the silicon substrate 201 and having the sixth axis as the detection axis, the processing circuit 27 that is an integrated circuit and that is formed on the silicon substrate 201, and the package 202 accommodating the silicon substrate 201 on which the first sensor element 21, the second sensor element 22, the third sensor element 23, the fourth sensor element 24, the fifth sensor element 25, the sixth sensor element 26, and the processing circuit 27 are formed. The first sensor element 21 detects the angular velocity around the Z-axis which is the first axis. The second sensor element 22 detects the angular velocity around the X-axis which is the second axis. The third sensor element 23 detects the angular velocity around the Y-axis which is the third axis. The fourth sensor element 24 detects the acceleration in the Z-axis direction which is the fourth axis. The fifth sensor element 25 detects the acceleration in the X-axis direction which is the fifth axis. The sixth sensor element 26 detects the acceleration in the Y-axis direction which is the sixth axis. The first sensor element 21, the second sensor element 22, the third sensor element 23, the fourth sensor element 24, the fifth sensor element 25, and the sixth sensor element 26 are electrically coupled to the processing circuit 27. In FIG. 11, a wiring formed on the upper surface of the package 202 and the silicon substrate 201 is not shown.

Also in the third embodiment, as in the first embodiment or the second embodiment, the detection accuracy of the first inertial sensor 10 is higher than the detection accuracy of the second inertial sensor 20. For example, the sensor element 11 included in the first inertial sensor 10 is an element made of a crystal having a large Q value and excellent temperature characteristics, whereas the first sensor element 21, the second sensor element 22, the third sensor element 23, the fourth sensor element 24, the fifth sensor element 25, and the sixth sensor element 26 included in the second inertial sensor 20 are elements formed of the silicon substrate 201 using a MEMS technique. The first inertial sensor 10 including the sensor element 11 is more expensive but has higher detection accuracy as compared with the second inertial sensor 20 including the first sensor element 21, the second sensor element 22, the third sensor element 23, the fourth sensor element 24, the fifth sensor element 25, and the sixth sensor element 26.

In the present embodiment, a detection signal detected by the first inertial sensor 10 having the detection accuracy higher than that of the second inertial sensor 20 is used for the angular velocity around the Z-axis that requires particularly high detection accuracy, and detection signals detected by the inexpensive second inertial sensor 20 having the detection accuracy lower than that of the first inertial sensor 10 are used for the angular velocity around the X-axis, the angular velocity around the Y-axis, the acceleration in the Z-axis direction, the acceleration in the X-axis direction, and the acceleration in the Y-axis direction that may require relatively low detection accuracy as compared with the angular velocity around the Z-axis.

Alternatively, as the angular velocity around the Z-axis, a detection signal detected by the second inertial sensor 20 instead of the detection signal detected by the first inertial sensor 10 is used in accordance with the range of the rotational motion acting on the Z-axis and the temperature. That is, the operation circuit 30 selects either a first output signal of the angular velocity around the Z-axis based on the detection signal of the angular velocity around the Z-axis output from the first inertial sensor 10 or a second output signal of the angular velocity around the Z-axis based on the detection signal of the angular velocity around the Z-axis output from the second inertial sensor 20 in accordance with the range of the rotational motion acting on the Z-axis and the temperature, and sets the selected output signal as an output signal of the angular velocity around the Z-axis. The operation circuit 30 generates six-axis output data including the output signal of the angular velocity around the Z-axis, an output signal of the angular velocity around the X-axis based on a detection signal of the angular velocity around the X-axis output from the second inertial sensor 20, an output signal of the angular velocity around the Y-axis based on a detection signal of the angular velocity around the Y-axis output from the second inertial sensor 20, an output signal of the acceleration in the Z-axis direction based on a detection signal of the acceleration in the Z-axis direction output from the second inertial sensor 20, an output signal of the acceleration in the X-axis direction based on a detection signal of the acceleration in the X-axis direction output from the second inertial sensor 20, and an output signal of the acceleration in the Y-axis direction based on a detection signal of the acceleration in the Y-axis direction output from the second inertial sensor 20, and outputs the six-axis output data to the host device.

The first inertial sensor 10 having high detection accuracy may be a quartz crystal sensor that detects an angular velocity around two or more axes, and in the present embodiment, the first inertial sensor 10 only detects an angular velocity around one axis in order to reduce a cost. The second inertial sensor 20 does not necessarily detect an angular velocity around the first axis, and the second inertial sensor 20 detects angular velocities around three axes and accelerations in three-axis direction in the present embodiment since a silicon MEMS sensor that detects angular velocities around three axes and accelerations in three-axis direction is in large demand and can be obtained at a low cost.

The inertial sensor module 1 according to the third embodiment described above has the same effect as the inertial sensor module 1 according to the first embodiment or the second embodiment.

Further, according to the inertial sensor module 1 in the third embodiment, since the first inertial sensor 10 has the first axis as the detection axis and the second inertial sensor 20 has the first axis, the second axis, the third axis, the fourth axis, the fifth axis, and the sixth axis as the detection axes, output signals of six axes in which the accuracy of the output signal of the first axis is higher than the accuracy of each of the output signals of the second axis, the third axis, the fourth axis, the fifth axis, and the sixth axis is obtained. Therefore, by using the inertial sensor module 1 according to the third embodiment, it is possible to implement a system in which higher detection accuracy is required for a specific one axis than the other five axes while preventing unnecessary costs.

4. Fourth Embodiment

Hereinafter, in a fourth embodiment, the same components as those in any one of the first embodiment to the third embodiment are denoted by the same reference numerals, repetitive description as that in any one of the first embodiment to the third embodiment is omitted or simplified, and contents different from those in any one of the first embodiment to the third embodiment will be mainly described.

Since a functional configuration of the inertial sensor module 1 according to the fourth embodiment is the same as that in FIG. 1 or FIG. 10, the illustration thereof is omitted. Since a structure of the inertial sensor module 1 according to the fourth embodiment is the same as that in FIGS. 3 to 6, the illustration thereof is omitted. The inertial sensor module 1 according to the fourth embodiment is different from the inertial sensor module 1 according to any one of the first embodiment to the third embodiment in a function and a configuration of the operation circuit 30.

In the fourth embodiment, the operation circuit 30 determines the presence or absence of a failure of the first inertial sensor 10 and the presence or absence of a failure of the second inertial sensor 20 based on the detection signal of the first axis output from the first inertial sensor 10 and the detection signal of the first axis output from the second inertial sensor 20, selects and outputs the second output signal of the first axis based on the detection signal of the first axis output from the second inertial sensor 20 when determining that a failure has occurred in the first inertial sensor 10, and selects and outputs the first output signal of the first axis based on the detection signal of the first axis output from the first inertial sensor 10 when determining that a failure has occurred in the second inertial sensor 20.

For example, when the inertial sensor module 1 has a configuration shown in FIG. 10, the first inertial sensor 10 detects the angular velocity of the first axis, and the second inertial sensor 20 detects the angular velocities of the first axis, the second axis, and the third axis and the accelerations of the fourth axis, the fifth axis, and the sixth axis, the operation circuit 30 determines whether the inertial sensor module 1 is stationary based on detection signals of the accelerations of the fourth axis, the fifth axis, and the sixth axis output from the second inertial sensor 20. Specifically, when an acceleration obtained by combining the accelerations of three axes including the fourth axis, the fifth axis, and the sixth axis coincides with a gravitational acceleration, the operation circuit 30 determines that the inertial sensor module 1 is stationary. Alternatively, when the inertial sensor module 1 has a configuration shown in FIG. 1 or FIG. 10, the operation circuit 30 may receive a signal indicating whether the inertial sensor module 1 is in a stationary state from a terminal (not shown) of the inertial sensor module 1, and determine whether the inertial sensor module 1 is stationary based on the signal.

The angular velocity acting on the first axis is 0 during a period when the inertial sensor module 1 is stationary. Accordingly, when no failure has occurred in the first inertial sensor 10 and the second inertial sensor 20, a voltage of the detection signal of the angular velocity of the first axis output from the first inertial sensor 10 and a voltage of the detection signal of the angular velocity of the first axis output from the second inertial sensor 20 are within a predetermined range including a reference voltage. Therefore, when the detection signal of the angular velocity of the first axis output from the first inertial sensor 10 is not within the predetermined range during the period in which the inertial sensor module 1 is stationary, the operation circuit 30 determines that a failure has occurred in the first inertial sensor 10, and selects and outputs the second output signal of the first axis. When the detection signal of the angular velocity of the first axis output from the second inertial sensor 20 is not within the predetermined range during the period in which the inertial sensor module 1 is stationary, the operation circuit 30 determines that a failure has occurred in the second inertial sensor 20 and selects and outputs the first output signal of the first axis.

When the detection signal of the angular velocity of the first axis output from the first inertial sensor 10 is within the predetermined range and the detection signal of the angular velocity of the first axis output from the second inertial sensor 20 changes beyond the predetermined range during a period in which the inertial sensor module 1 is not stationary, the operation circuit 30 may determine that a failure has occurred in the first inertial sensor 10, and may select and output the second output signal of the first axis. Similarly, when the detection signal of the angular velocity of the first axis output from the first inertial sensor 10 changes beyond the predetermined range and the detection signal of the angular velocity of the first axis output from the second inertial sensor 20 is within the predetermined range during the period in which the inertial sensor module 1 is not stationary, the operation circuit 30 may determine that a failure has occurred in the second inertial sensor 20, and may select and output the first output signal of the first axis.

When determining that no failure has occurred in either the first inertial sensor 10 or the second inertial sensor 20, the operation circuit 30 selects either the first output signal of the first axis or the second output signal of the first axis in accordance with at least one of the range of the motion acting on the first axis and the temperature.

Figure 12:
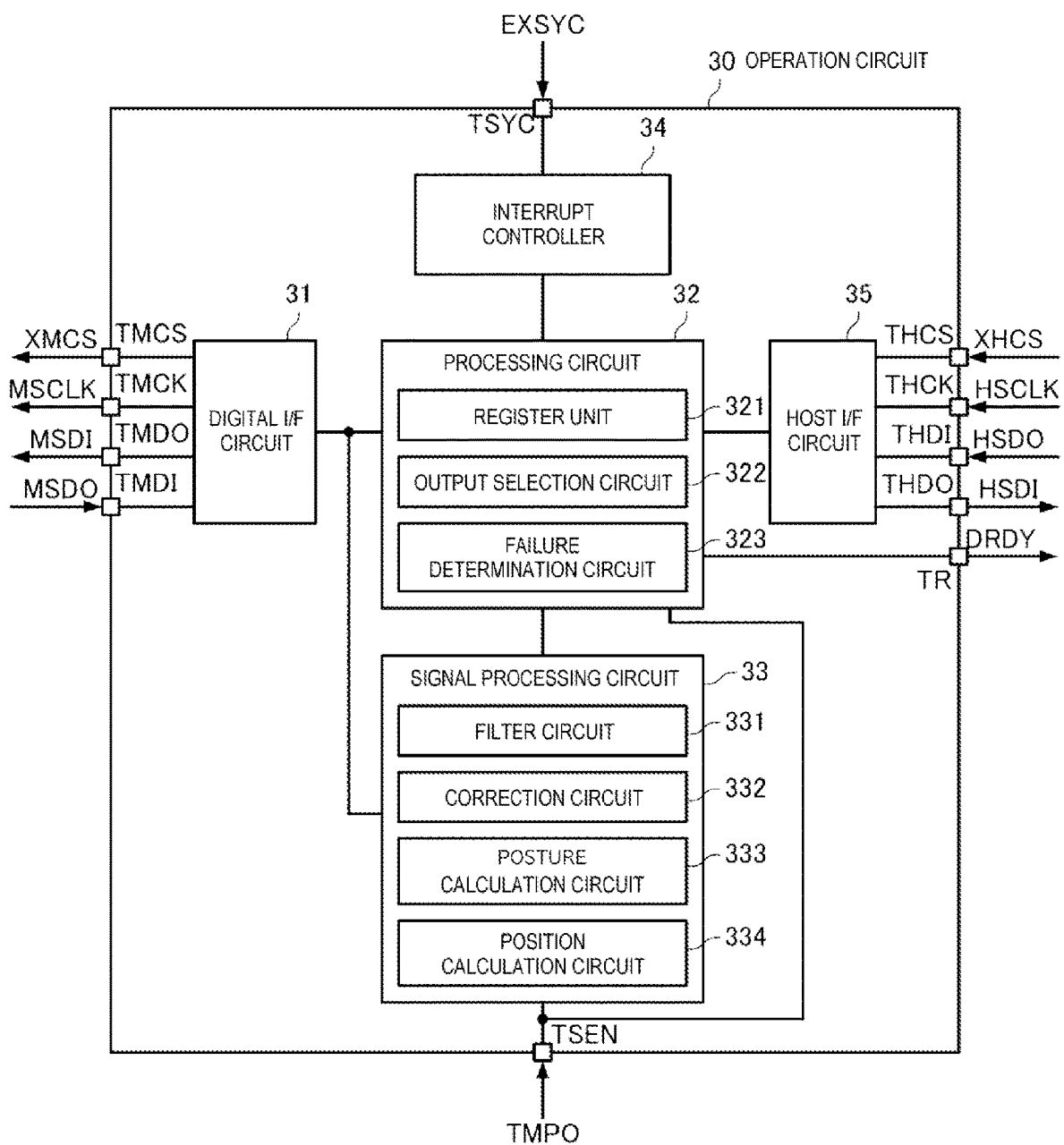
FIG. 12 is a diagram showing a configuration example of an operation circuit according to a fourth embodiment.

FIG. 12 is a diagram showing a configuration example of the operation circuit 30 included in the inertial sensor module 1 according to the fourth embodiment. As shown in FIG. 12, as in any one of the first embodiment to the third embodiment, the operation circuit 30 according to the fourth embodiment includes the digital interface circuit 31, the processing circuit 32, the signal processing circuit 33, the interrupt controller 34, and the host interface circuit 35. Since the functions of the digital interface circuit 31, the signal processing circuit 33, the interrupt controller 34, and the host interface circuit 35 are the same as those in any one of the first embodiment to the third embodiment, the description thereof will be omitted.

In the present embodiment, the processing circuit 32 includes the register unit 321, the output selection circuit 322, and a failure determination circuit 323. The failure determination circuit 323 determines the presence or absence of a failure of the first inertial sensor 10 and the presence or absence of a failure of the second inertial sensor 20 based on the detection signal of the first axis included in the first detection data SD1 output from the first inertial sensor 10 and the detection signal of the first axis included in the second detection data SD2 output from the second inertial sensor 20. For example, the failure determination circuit 323 determines whether the inertial sensor module 1 is stationary based on detection signals of the fourth axis, the fifth axis, and the sixth axis included in the second detection data SD2 after the operation by the signal processing circuit 33. The failure determination circuit 323 determines whether the inertial sensor module 1 is stationary based on detection signals of the fourth axis, the fifth axis, and the sixth axis included in second detection data SD2 before the operation by the signal processing circuit 33. Alternatively, the failure determination circuit 323 may determine whether the inertial sensor module 1 is stationary based on a predetermined signal received from outside of the inertial sensor module 1.

During the period in which the inertial sensor module 1 is stationary, the failure determination circuit 323 determines that a failure has occurred in the first inertial sensor 10 when the detection signal of the first axis included in the first detection data SD1 is not within the predetermined range, and determines that a failure has occurred in the second inertial sensor 20 when the detection signal of the first axis included in the second detection data SD2 is not within the predetermined range.

When the failure determination circuit 323 determines that a failure has occurred in the first inertial sensor 10, the output selection circuit 322 selects the second output signal of the first axis, which is the detection signal of the first axis included in the second detection data SD2. When the failure determination circuit 323 determines that a failure has occurred in the second inertial sensor 20, the output selection circuit 322 selects the first output signal of the first axis, which is the detection signal of the first axis included in the first detection data SD1. When the failure determination circuit 323 determines that no failure has occurred in either the first inertial sensor 10 or the second inertial sensor 20, the output selection circuit 322 selects either the first output signal of the first axis or the second output signal of the first axis in accordance with at least one of the range of the motion acting on the first axis and the temperature.

Since the other functions of the processing circuit 32 are the same as those in any one of the first embodiment to the third embodiment, the description thereof will be omitted.

The inertial sensor module 1 according to the fourth embodiment described above has the same effect as the inertial sensor module 1 according to any one of the first embodiment to the third embodiment.

Further, in the inertial sensor module 1 according to the fourth embodiment, the operation circuit 30 determines the presence or absence of a failure of the first inertial sensor 10 and the presence or absence of a failure of the second inertial sensor 20, selects and outputs the second output signal of the first axis based on the detection signal of the first axis output from the second inertial sensor 20 when determining that a failure has occurred in the first inertial sensor 10, and selects and outputs the first output signal of the first axis based on the detection signal of the first axis output from the first inertial sensor 10 when determining that a failure has occurred in the second inertial sensor 20. Therefore, according to the inertial sensor module 1 in the fourth embodiment, the reliability of the output signal of the first axis can be improved.

5. Fifth Embodiment

Hereinafter, in a fifth embodiment, the same components as those of any one of the first embodiment to the fourth embodiment are denoted by the same reference numerals, the same description as that in any one of the first embodiment to the fourth embodiment is omitted or simplified, and contents different from those of any one of the first embodiment to the fourth embodiment will be mainly described.

Since a functional configuration of the inertial sensor module 1 according to the fifth embodiment is the same as that in FIG. 1 or FIG. 10, the illustration thereof is omitted. Since a structure of the inertial sensor module 1 according to the fifth embodiment is the same as that in FIGS. 3 to 6, the illustration thereof is omitted. The inertial sensor module 1 according to the fifth embodiment is different from the inertial sensor module 1 according to any one of the first embodiment to the fourth embodiment in a function and a configuration of the operation circuit 30.

Also in the fifth embodiment, as in any one of the first embodiment to the fourth embodiment, the detection accuracy of the first inertial sensor 10 is higher than the detection accuracy of the second inertial sensor 20. In the fifth embodiment, the operation circuit 30 receives the detection signal of the first axis output from the first inertial sensor 10 and the detection signal of the first axis output from the second inertial sensor 20, and corrects the detection signal of the first axis output from the first inertial sensor 10 when the magnitude of the detection signal of the first axis output from the second inertial sensor 20 is within a predetermined range. For example, when the input and output characteristics of the sensor element 11 and the first sensor element 21 are as shown in FIG. 7, the operation circuit 30 may correct the nonlinearity of the detection signal of the angular velocity around the Z-axis output from the first inertial sensor 10 when the angular velocity around the Z-axis is smaller than −q1 [dps] or larger than +q2 [dps]. Specifically, an error of the input and output characteristics of the sensor element 11 with respect to the ideal straight line is calculated in advance, a nonlinearity correction table that defines corresponding relations between the angular velocity acting on the Z-axis and the error is created and stored in a memory. The operation circuit 30 calculates an angular velocity around the Z-axis based on the detection signal of the angular velocity around the Z-axis output from the second inertial sensor 20, specifies an error based on the nonlinearity correction table when the angular velocity around the Z-axis is in a range smaller than −q1 [dps] or larger than +q2 [dps], and corrects the detection signal of the angular velocity around the Z-axis output from the first inertial sensor 10 by subtracting the error.

As in the third embodiment or the fourth embodiment, the operation circuit 30 may select either the first output signal of the first axis or the second output signal of the first axis in accordance with the temperature. As in the fourth embodiment, the operation circuit 30 may determine the presence or absence of a failure in the first inertial sensor 10 and the presence or absence of a failure in the second inertial sensor 20. When determining that a failure has occurred in the first inertial sensor 10 or the second inertial sensor 20, the operation circuit 30 may select either the first output signal of the first axis or the second output signal of the first axis without correcting the detection signal of the first axis output from the first inertial sensor 10.

Figure 13:
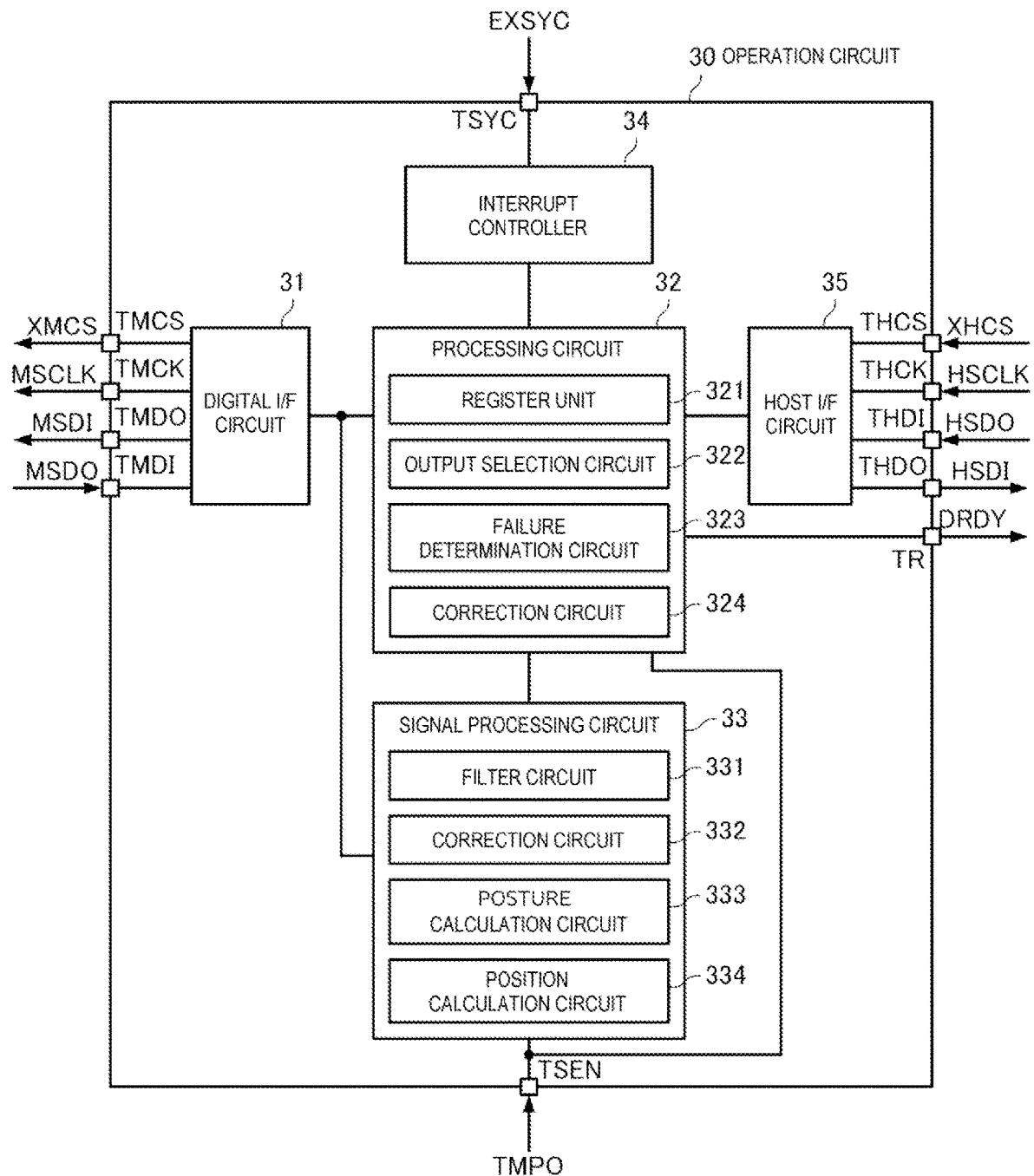
FIG. 13 is a diagram showing a configuration example of an operation circuit according to a fifth embodiment.

FIG. 13 is a diagram showing a configuration example of the operation circuit 30 included in the inertial sensor module 1 according to the fifth embodiment. As shown in FIG. 13, as in any one of the first embodiment to the fourth embodiment, the operation circuit 30 according to the fifth embodiment includes the digital interface circuit 31, the processing circuit 32, the signal processing circuit 33, the interrupt controller 34, and the host interface circuit 35. Since the functions of the digital interface circuit 31, the signal processing circuit 33, the interrupt controller 34, and the host interface circuit 35 are the same as those in any one of the first embodiment to the fourth embodiment, the description thereof will be omitted.

In the present embodiment, the processing circuit 32 includes the register unit 321, the output selection circuit 322, the failure determination circuit 323, and a correction circuit 324.

The correction circuit 324 receives the detection signal of the first axis included in the first detection data SD1 output from the first inertial sensor 10 and the detection signal of the first axis included in the second detection data SD2 output from the second inertial sensor 20, and corrects the detection signal of the first axis included in the first detection data SD1 when a magnitude of the detection signal of the first axis included in the second detection data SD2 is within a predetermined range.

Specifically, when the magnitude of the detection signal of the first axis included in the second detection data SD2 after the operation by the signal processing circuit 33 is within the predetermined range, the correction circuit 324 corrects the detection signal of the first axis included in the first detection data SD1 after the operation by the signal processing circuit 33. For example, the correction circuit 324 may correct the nonlinearity of the detection signal of the first axis included in the first detection data SD1 when the magnitude of the detection signal of the first axis included in the second detection data SD2 is within the predetermined range.

When the failure determination circuit 323 determines that a failure has occurred in the first inertial sensor 10, the output selection circuit 322 selects the second output signal of the first axis, which is the detection signal of the first axis included in the second detection data SD2. When the failure determination circuit 323 determines that a failure has occurred in the second inertial sensor 20, the output selection circuit 322 selects the first output signal of the first axis, which is the corrected detection signal of the first axis included in the first detection data SD1. When the failure determination circuit 323 determines that no failure has occurred in either the first inertial sensor 10 or the second inertial sensor 20, the output selection circuit 322 may select either the first output signal of the first axis or the second output signal of the first axis in accordance with the temperature.

Since the other functions of the processing circuit 32 are the same as those in any one of the first embodiment to the fourth embodiment, the description thereof will be omitted.

The inertial sensor module 1 according to the fifth embodiment described above has the same effect as the inertial sensor module 1 according to any one of the first embodiment to the fourth embodiment.

Furthermore, in the inertial sensor module 1 according to the fifth embodiment, the operation circuit 30 corrects the detection signal of the first axis output from the first inertial sensor 10 when the magnitude of the detection signal of the first axis output from the second inertial sensor 20 is within the predetermined range. Therefore, according to the inertial sensor module 1 in the fifth embodiment, even in a situation in which the detection accuracy of the first inertial sensor 10 decreases, high detection accuracy for the first axis can be achieved.

6. Modifications

The present disclosure is not limited to the embodiments, and various modifications can be made within the scope of the gist of the present disclosure.

Figure 14:
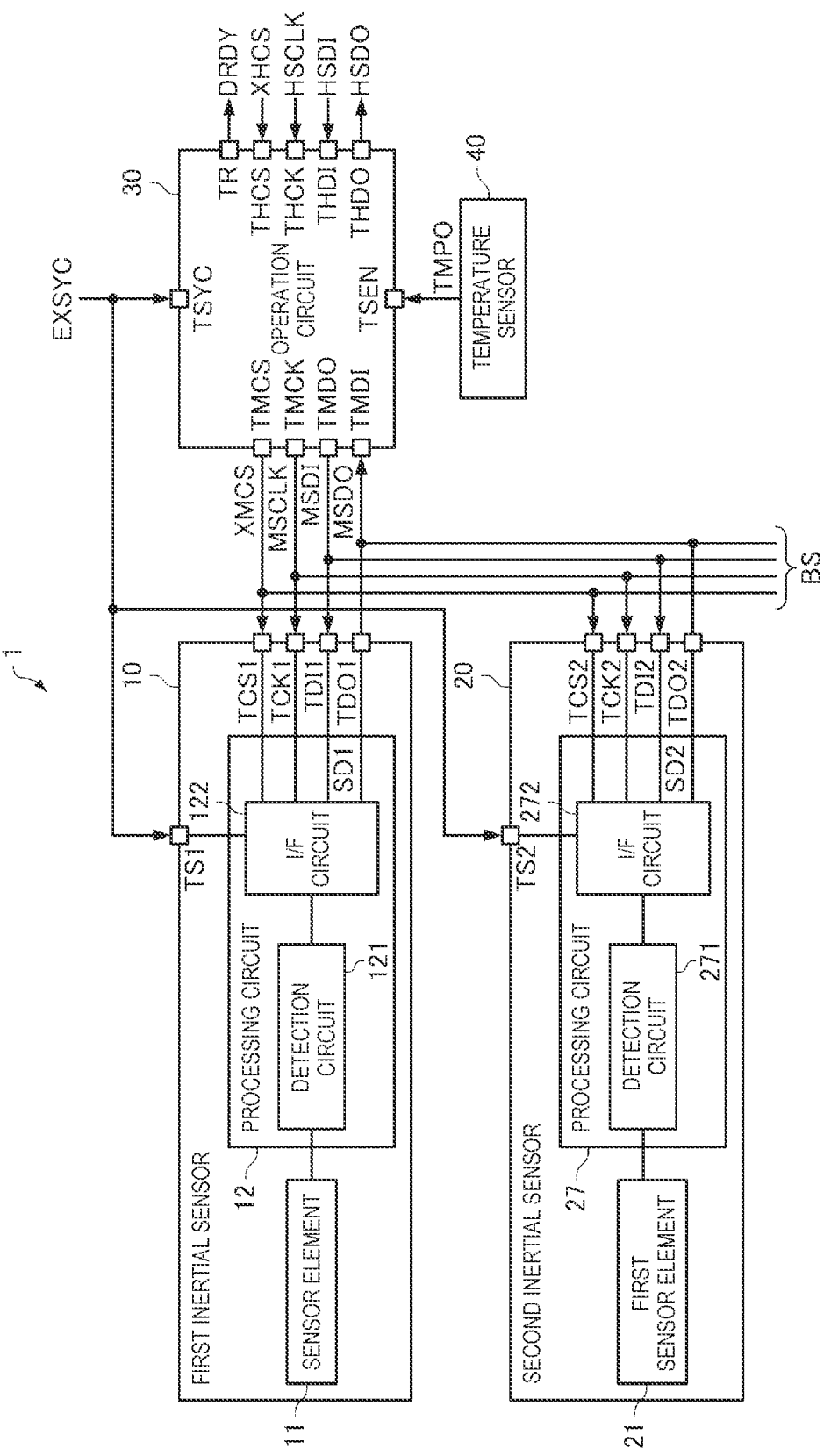
FIG. 14 is a diagram showing an example of a functional configuration of an inertial sensor module according to a modification.

In the above-mentioned embodiments, the second inertial sensor 20 detects physical quantities of three axes or six axes, and the second inertial sensor 20 may detect a physical quantity of one axis, physical quantities of two axes, four axes, five axes, or seven or more axes. As an example, FIG. 14 shows an example of a functional configuration of the inertial sensor module 1 including the second inertial sensor 20 that detects a physical quantity of one axis. In the example of FIG. 14, the sensor element 11 included in the first inertial sensor 10 and the first sensor element 21 included in the second inertial sensor 20 are both sensor elements that detect the same type of physical quantity with the first axis as the detection axis. As in the above-mentioned embodiments, the detection accuracy of the first inertial sensor 10 is higher than the detection accuracy of the second inertial sensor 20. The operation circuit 30 receives the detection signal of the first axis included in the first detection data SD1 output from the first inertial sensor 10 and the detection signal of the first axis included in the second detection data SD2 output from the second inertial sensor 20, and selects and outputs either the first output signal of the first axis based on the detection signal of the first axis included in the first detection data SD1 or the second output signal of the first axis based on the detection signal of the first axis included in the second detection data SD2. For example, the operation circuit 30 may select and output either the first output signal of the first axis or the second output signal of the first axis in accordance with the range of the motion acting on the first axis of the first inertial sensor 10 and the second inertial sensor 20, or may select and output either the first output signal of the first axis or the second output signal of the first axis in accordance with the temperature. In addition, the operation circuit 30 may perform various operations on the first detection data SD1 and the second detection data SD2. Specifically, the operation circuit 30 may perform a filter operation, correction operations such as temperature correction, zero-point correction, sensitivity correction, and nonlinearity correction, a downsampling operation, and the like on the first detection data SD1 and the second detection data SD2.

Alternatively, the operation circuit 30 may receive the detection signal of the first axis included in the first detection data SD1 output from the first inertial sensor 10 and the detection signal of the first axis included in the second detection data SD2 output from the second inertial sensor 20, and correct the detection signal of the first axis included in the first detection data SD1 when the magnitude of the detection signal of the first axis included in the second detection data SD2 is within a predetermined range. For example, the operation circuit 30 may correct the nonlinearity of the detection signal of the first axis included in the first detection data SD1 when the magnitude of the detection signal of the first axis included in the second detection data SD2 is within the predetermined range.

The operation circuit 30 is configured, for example, as shown in FIGS. 2, 8, 12, or 13. According to the inertial sensor module 1 in the modification, the same effects as those of the inertial sensor module 1 according to any one of the first embodiment to the fifth embodiment can be obtained.

In the fourth embodiment described above, the presence or absence of a failure in the first inertial sensor 10 and the presence or absence of a failure in the second inertial sensor 20 are determined based on the detection signal of the first axis output from the first inertial sensor 10 and the detection signal of the first axis output from the second inertial sensor 20 during the period in which the inertial sensor module 1 is stationary, and a failure determination method is not limited thereto. For example, the inertial sensor module 1 further includes a third inertial sensor that detects a physical quantity of the first axis. The operation circuit 30 may determine the presence or absence of a failure in the first inertial sensor 10 and the presence or absence of a failure in the second inertial sensor 20 by a majority-voting logic based on the detection signal of the first axis output from the first inertial sensor 10, the detection signal of the first axis output from the second inertial sensor 20, and a detection signal of the first axis output from the third inertial sensor. For example, when a difference between the detection signal of the first axis output from the second inertial sensor 20 and the detection signal of the first axis output from the third inertial sensor is within a predetermined range, and a difference between the detection signal of the first axis output from the first inertial sensor 10 and the detection signal of the first axis output from the second inertial sensor 20 or the difference between the detection signal of the first axis output from the first inertial sensor 10 and the detection signal of the first axis output from the third inertial sensor exceeds a predetermined range, the operation circuit 30 may determine that a failure has occurred in the first inertial sensor 10. When the difference between the detection signal of the first axis output from the first inertial sensor 10 and the detection signal of the first axis output from the third inertial sensor is within the predetermined range, and the difference between the detection signal of the first axis output from the first inertial sensor 10 and the detection signal of the first axis output from the second inertial sensor 20 or the difference between the detection signal of the first axis output from the second inertial sensor 20 and the detection signal of the first axis output from the third inertial sensor exceeds the predetermined range, the operation circuit 30 may determine that a failure has occurred in the second inertial sensor 20.

In the above-mentioned embodiments, the inertial sensor module 1 includes the first inertial sensor 10 having relatively high detection accuracy and the second inertial sensor 20 having relatively low detection accuracy. On the other hand, the inertial sensor module 1 may further include a third inertial sensor having the same detection accuracy as the first inertial sensor 10, in addition to the first inertial sensor 10 and the second inertial sensor 20. The third inertial sensor may be, for example, an inertial sensor having the same structure as the first inertial sensor 10. The operation circuit 30 may generate an output signal of the first axis by averaging the detection signal of the first axis output from the first inertial sensor 10 and the detection signal of the first axis output from the third inertial sensor. By this averaging, the output signal of the first axis with reduced noise is obtained. The operation circuit 30 may determine whether a failure may have occurred in each of the first inertial sensor 10, the second inertial sensor 20, and the third inertial sensor by, for example, the majority-voting logic based on the detection signal of the first axis output from the first inertial sensor 10, the detection signal of the first axis output from the second inertial sensor 20, and the detection signal of the first axis output from the third inertial sensor.

Alternatively, the inertial sensor module 1 may further include a third inertial sensor having the same detection accuracy as the second inertial sensor 20, in addition to the first inertial sensor 10 and the second inertial sensor 20. The third inertial sensor may be, for example, an inertial sensor having the same structure as the second inertial sensor 20. The operation circuit 30 may generate an output signal of each axis other than the first axis by averaging a detection signal of each axis other than the first axis output from the second inertial sensor 20 and a detection signal of each axis other than the first axis output from the third inertial sensor. By this averaging, the output signal of each axis other than the first axis with reduced noise is obtained. The operation circuit 30 may determine whether a failure may have occurred in each of the first inertial sensor 10, the second inertial sensor 20, and the third inertial sensor by, for example, the majority-voting logic based on the detection signal of the first axis output from the first inertial sensor 10, the detection signal of the first axis output from the second inertial sensor 20, and the detection signal of the first axis output from the third inertial sensor. The operation circuit 30 may determine whether a failure may have occurred in the second inertial sensor 20 or the third inertial sensor by, for example, the majority-voting logic based on the detection signal of each axis other than the first axis output from the second inertial sensor 20 and the detection signal of each axis other than the first axis output from the third inertial sensor.

Alternatively, the inertial sensor module 1 may further include a third inertial sensor having the same detection accuracy as the first inertial sensor 10 and a fourth inertial sensor having the same detection accuracy as the second inertial sensor 20. The third inertial sensor may be, for example, an inertial sensor having the same structure as the first inertial sensor 10, and the fourth inertial sensor may be, for example, an inertial sensor having the same structure as the second inertial sensor 20. The operation circuit 30 may generate an output signal of the first axis by averaging the detection signal of the first axis output from the first inertial sensor 10 and the detection signal of the first axis output from the third inertial sensor, and generate an output signal of each axis other than the first axis by averaging the detection signal of each axis other than the first axis output from the second inertial sensor 20 and a detection signal of each axis other than the first axis output from the fourth inertial sensor. By this averaging, the output signal of each axis with reduced noise is obtained. The operation circuit 30 may determine whether a failure may have occurred in each of the first inertial sensor 10, the second inertial sensor 20, the third inertial sensor, and the fourth inertial sensor by, for example, the majority-voting logic based on the detection signal of the first axis output from the first inertial sensor 10, the detection signal of the first axis output from the second inertial sensor 20, the detection signal of the first axis output from the third inertial sensor, and a detection signal of the first axis output from the fourth inertial sensor. The operation circuit 30 may determine whether a failure may have occurred in the second inertial sensor 20 or the fourth inertial sensor by, for example, the majority-voting logic based on the detection signal of each axis other than the first axis output from the second inertial sensor 20 and the detection signal of each axis other than the first axis output from the fourth inertial sensor.

In the above-mentioned embodiments, an example is given in which the first inertial sensor 10 having relatively high accuracy is a crystal sensor and the second inertial sensor 20 having relatively low accuracy is a silicon MEMS sensor, and the present disclosure is not limited thereto. For example, the first inertial sensor 10 having relatively high accuracy may be a FOG sensor, and the second inertial sensor 20 having relatively low accuracy may be a silicon MEMS sensor. The FOG is an abbreviation for fiber optic gyroscope.

The embodiments and modifications described above are merely examples, and the present disclosure is not limited thereto. For example, each embodiment and each modification can be combined as appropriate.

The present disclosure includes a configuration substantially the same as the configurations described in the embodiments (for example, a configuration having the same functions, methods, and results, or a configuration having the same objects and effects). In addition, the present disclosure includes a configuration in which an unnecessary portion of the configurations described in the embodiments is replaced. The present disclosure includes a configuration having the same functions and effects as the configurations described in the embodiments, or a configuration capable of achieving the same objects. The present disclosure includes a configuration in which a known technique is added to the configuration described in the embodiment.

The following contents are derived from the above embodiments and modifications.

One aspect of an inertial sensor module includes: a first inertial sensor having a first axis as a detection axis; a second inertial sensor having the first axis as a detection axis, and an operation circuit in which detection accuracy of the first inertial sensor is higher than detection accuracy of the second inertial sensor, and the operation circuit receives a detection signal of the first axis output from the first inertial sensor and a detection signal of the first axis output from the second inertial sensor, and selects and outputs either a first output signal based on the detection signal of the first axis output from the first inertial sensor or a second output signal based on the detection signal of the first axis output from the second inertial sensor.

According to the inertial sensor module, since the detection accuracy of the first inertial sensor having the first axis as the detection axis is higher than the detection accuracy of the second inertial sensor having the first axis as the detection axis, the operation circuit selects and outputs the first output signal based on the detection signal of the first axis output from the first inertial sensor, thereby achieving high detection accuracy for the first axis. According to the inertial sensor module, in a situation in which the detection accuracy of the first inertial sensor is significantly reduced, the operation circuit selects and outputs the second output signal based on the detection signal of the first axis output from the second inertial sensor, thereby reducing the possibility that the detection accuracy for the first axis is significantly reduced.

In one aspect of the inertial sensor module, the operation circuit may select and output either the first output signal or the second output signal in accordance with a range of motion acting on the first axis of the first inertial sensor and the second inertial sensor.

According to the inertial sensor module, in a range of motion in which the detection accuracy of the first inertial sensor is high, the operation circuit selects and outputs the first output signal, thereby achieving high detection accuracy for the first axis. In a range of the motion in which the detection accuracy of the first inertial sensor is significantly reduced, the operation circuit selects and outputs the second output signal, thereby reducing the possibility that the detection accuracy for the first axis is significantly reduced.

In one aspect of the inertial sensor module, the operation circuit may determine presence or absence of a failure of the first inertial sensor and presence or absence of a failure of the second inertial sensor based on the detection signal of the first axis output from the first inertial sensor and the detection signal of the first axis output from the second inertial sensor, select and output the second output signal when determining that a failure has occurred in the first inertial sensor, and select and output the first output signal when determining that a failure has occurred in the second inertial sensor.

According to the inertial sensor module, the operation circuit selects and outputs the second output signal based on the detection signal of the first axis output from the second inertial sensor when determining that a failure has occurred in the first inertial sensor, and selects and outputs the first output signal based on the detection signal of the first axis output from the first inertial sensor when determining that a failure has occurred in the second inertial sensor, thereby improving the reliability of the output signal of the first axis.

In one aspect of the inertial sensor module, the operation circuit may select and output either the first output signal or the second output signal in accordance with temperature.

According to the inertial sensor module, at a temperature at which the detection accuracy of the first inertial sensor is high, the operation circuit selects and outputs the first output signal, thereby achieving high detection accuracy for the first axis. At a temperature at which the detection accuracy of the first inertial sensor is significantly reduced, the operation circuit selects and outputs the second output signal, thereby reducing the possibility that the detection accuracy for the first axis is significantly reduced.

Another aspect of an inertial sensor module includes: a first inertial sensor having a first axis as a detection axis; a second inertial sensor having the first axis as a detection axis; and an operation circuit, in which detection accuracy of the first inertial sensor is higher than detection accuracy of the second inertial sensor, and the operation circuit receives a detection signal of the first axis output from the first inertial sensor and a detection signal of the first axis output from the second inertial sensor, and corrects the detection signal of the first axis output from the first inertial sensor when a magnitude of the detection signal of the first axis output from the second inertial sensor is within a predetermined range.

According to the inertial sensor module, since the operation circuit corrects the detection signal of the first axis output from the first inertial sensor when the magnitude of the detection signal of the first axis output from the second inertial sensor is within the predetermined range, high detection accuracy for the first axis can be achieved even in a situation in which the detection accuracy of the first inertial sensor is reduced.

In one aspect of the inertial sensor module, the second inertial sensor may further have a second axis and a third axis as detection axes.

According to the inertial sensor module, output signals of three axes in which the accuracy of the output signal of the first axis is higher than the accuracy of each of the output signals of the second axis and the third axis is obtained.

Therefore, by using the inertial sensor module, it is possible to implement a system in which higher detection accuracy is required for a specific one axis than the other two axes while preventing unnecessary costs.

In one aspect of the inertial sensor module, the second inertial sensor may further have a fourth axis, a fifth axis, and a sixth axis as detection axes.

According to the inertial sensor module, output signals of six axes in which the accuracy of the output signal of the first axis is higher than the accuracy of each of the output signals of the second axis, the third axis, the fourth axis, the fifth axis, and the sixth axis are obtained. Therefore, by using the inertial sensor module, it is possible to implement a system in which higher detection accuracy is required for a specific one axis than the other five axes while preventing unnecessary costs.

What is claimed is:

1. An inertial sensor module comprising:
    a first inertial sensor having a first axis as a detection axis;
    a second inertial sensor having the first axis as a detection axis; and
    an operation circuit, wherein
    detection accuracy of the first inertial sensor is higher than detection accuracy of the second inertial sensor, and
    the operation circuit receives a first detection signal of the first axis output from the first inertial sensor and a second detection signal of the first axis output from the second inertial sensor, and selects and outputs either a first output signal based on the first detection signal of the first axis output from the first inertial sensor or a second output signal based on the second detection signal of the first axis output from the second inertial sensor, wherein
    the first inertial sensor and the second inertial sensor detect a same physical quantity, and
    the operation circuit selects and outputs either the first output signal or the second output signal in accordance with a range of motion acting on the first axis of the first inertial sensor and the second inertial sensor such that the operation circuit selects and outputs the first output signal when a magnitude of the motion is within a predetermined range, and selects and outputs the second output signal when the magnitude of the motion is not within the predetermined range.

2. The inertial sensor module according to claim 1, wherein
    the operation circuit determines presence or absence of a failure of the first inertial sensor and presence or absence of a failure of the second inertial sensor based on the first detection signal of the first axis output from the first inertial sensor and the second detection signal of the first axis output from the second inertial sensor, selects and outputs the second output signal when determining that a failure has occurred in the first inertial sensor, and selects and outputs the first output signal when determining that a failure has occurred in the second inertial sensor.

3. An inertial sensor module comprising:
    a first inertial sensor having a first axis as a detection axis;
    a second inertial sensor having the first axis as a detection axis; and
    an operation circuit, wherein
    detection accuracy of the first inertial sensor is higher than detection accuracy of the second inertial sensor, and
    the operation circuit receives a first detection signal of the first axis output from the first inertial sensor and a second detection signal of the first axis output from the second inertial sensor, and selects and outputs either a first output signal based on the first detection signal of the first axis output from the first inertial sensor or a second output signal based on the second detection signal of the first axis output from the second inertial sensor, wherein
    the first inertial sensor and the second inertial sensor detect a same physical quantity, and
    the operation circuit selects and outputs either the first output signal or the second output signal in accordance with temperature such that the operation circuit selects and outputs the first output signal when the temperature is within a predetermined range, and selects and outputs the second output signal when the temperature is not within the predetermined range.

4. An inertial sensor module comprising:
    a first inertial sensor having a first axis as a detection axis;
    a second inertial sensor having the first axis as a detection axis; and
    an operation circuit, wherein
    detection accuracy of the first inertial sensor is higher than detection accuracy of the second inertial sensor, and
    the operation circuit receives a first detection signal of the first axis output from the first inertial sensor and a second detection signal of the first axis output from the second inertial sensor, and corrects the first detection signal of the first axis output from the first inertial sensor when a magnitude of the second detection signal of the first axis output from the second inertial sensor is within a predetermined range.

5. The inertial sensor module according to claim 1, wherein
    the second inertial sensor further has a second axis and a third axis as detection axes.

6. The inertial sensor module according to claim 5, wherein
    the second inertial sensor further has a fourth axis, a fifth axis, and a sixth axis as detection axes.

7. The inertial sensor module according to claim 3, wherein
    the second inertial sensor further has a second axis and a third axis as detection axes.

8. The inertial sensor module according to claim 7, wherein
    the second inertial sensor further has a fourth axis, a fifth axis, and a sixth axis as detection axes.

9. The inertial sensor module according to claim 4, wherein
    the second inertial sensor further has a second axis and a third axis as detection axes.

10. The inertial sensor module according to claim 9, wherein
    the second inertial sensor further has a fourth axis, a fifth axis, and a sixth axis as detection axes.

11. The inertial sensor module according to claim 4, wherein
    in the correction of the first detection signal, the operation circuit corrects a nonlinearity of the first detection signal using a nonlinearity correction table, specifies an error based on the nonlinearity correction table, and corrects the first detection signal output from the first inertial sensor by subtracting the error.

* * * * *